United States Patent
Naef et al.

(10) Patent No.: US 11,241,637 B2
(45) Date of Patent: Feb. 8, 2022

(54) DEVICE FOR THE THERMAL TREATMENT OF MATERIAL, IN PARTICULAR FOR THE THERMAL SEPARATION OF MATERIAL COMPONENTS CONTAINED IN THE MATERIAL

(71) Applicant: BUSS-SMS-CANZLER GMBH, Butzbach (DE)

(72) Inventors: Rainer Naef, Dietikon (CH); Johannes Böing, Nideggen (DE); Michael Rüger, Uttenreuth (DE)

(73) Assignee: BUSS-SMS-CANZLER GMBH, Butzbach (DE)

( * ) Notice: Subject to any disclaimer, the term of this patent is extended or adjusted under 35 U.S.C. 154(b) by 0 days.

(21) Appl. No.: 16/991,420

(22) Filed: Aug. 12, 2020

(65) Prior Publication Data
US 2021/0046398 A1    Feb. 18, 2021

(30) Foreign Application Priority Data
Aug. 12, 2019   (CH) ..................... 01005/19

(51) Int. Cl.
*B01D 1/22* (2006.01)
*B01D 1/08* (2006.01)
(Continued)

(52) U.S. Cl.
CPC ............. *B01D 1/223* (2013.01); *B01D 1/08* (2013.01); *B01D 3/085* (2013.01); *B01D 3/10* (2013.01);
(Continued)

(58) Field of Classification Search
CPC .......... B01D 1/08; B01D 1/223; B01D 3/085; B01D 3/10; B01D 5/0012; B01D 5/006; B01D 5/0078
See application file for complete search history.

(56) References Cited

U.S. PATENT DOCUMENTS

| | | | | |
|---|---|---|---|---|
| 2,403,978 A | * | 7/1946 | Hickman | B01D 3/10 202/205 |
| 2,546,381 A | * | 3/1951 | Zahm | B01D 1/225 159/6.2 |

(Continued)

FOREIGN PATENT DOCUMENTS

| | | |
|---|---|---|
| CH | 478394 A | 9/1969 |
| CN | 103801100 B | 9/2015 |

(Continued)

OTHER PUBLICATIONS

Nov. 12, 2019 Search Report issued in Swiss Federal Institute of Intellectual Property (IPI) in Swiss Application No. 01005/19.
(Continued)

*Primary Examiner* — Jonathan Miller
(74) *Attorney, Agent, or Firm* — Oliff PLC

(57) ABSTRACT

A device for the thermal treatment of material comprises a housing having a heatable housing jacket, which surrounds a treatment chamber and forms a rotationally symmetrical treatment surface extending in an axial direction, and a drivable rotor, which is arranged in the treatment chamber and extends coaxially. The rotor comprises a shaft, arranged in a manner distributed over the circumference of which are spreading elements. The device also comprises a condensation space, in which a condenser is formed and into which gaseous material components escaping from the material during the thermal treatment can pass, a condensate outlet for discharging the material components condensed in the condensation space, and a vacuum connection, which is fluidically connected to the condensation space. The vacuum connection is arranged in a region of the housing that lies downstream of the treatment surface, as viewed in the transport direction of the material.

17 Claims, 19 Drawing Sheets

(51) Int. Cl.
*B01D 3/08* (2006.01)
*B01D 3/10* (2006.01)
*B01D 5/00* (2006.01)

(52) U.S. Cl.
CPC ........... *B01D 5/006* (2013.01); *B01D 5/0012* (2013.01); *B01D 5/0078* (2013.01)

(56) References Cited

U.S. PATENT DOCUMENTS

| | | | | |
|---|---|---|---|---|
| 2,955,990 | A * | 10/1960 | Smith | B01D 1/222 203/72 |
| 3,020,211 | A * | 2/1962 | Smith | B01D 1/225 203/72 |
| 3,107,194 | A | 10/1963 | Bechtler | |
| 3,252,502 | A * | 5/1966 | Eckardt | B01D 1/226 159/49 |
| 3,292,683 | A * | 12/1966 | Buchi | B01D 1/223 159/6.2 |
| 3,395,419 | A | 8/1968 | Nunlist et al. | |
| 3,464,478 | A | 9/1969 | Ueda et al. | |
| 3,474,850 | A * | 10/1969 | Rolf | B01D 1/225 159/6.2 |
| 3,695,327 | A * | 10/1972 | Widmer | B01D 1/225 159/6.2 |
| 4,053,006 | A * | 10/1977 | Tkac | B01D 1/225 159/6.2 |
| 4,093,479 | A * | 6/1978 | Baird | B01D 1/226 159/13.2 |
| 4,282,058 | A * | 8/1981 | Gruter | B01D 1/222 159/13.1 |
| 4,981,554 | A * | 1/1991 | Loconsolo | B01D 1/225 159/6.1 |
| 5,185,060 | A * | 2/1993 | Yamasaki | B01D 1/225 159/13.1 |
| 5,888,288 | A * | 3/1999 | Quigley | C08B 1/003 106/200.3 |
| 10,821,414 | B2 * | 11/2020 | Naef | B01D 3/12 |
| 2006/0231378 | A1 | 10/2006 | Wolfgang et al. | |
| 2019/0247823 | A1 * | 8/2019 | Naef | B01D 1/225 |
| 2020/0306659 | A1 * | 10/2020 | Bublies | B01D 5/006 |

FOREIGN PATENT DOCUMENTS

| | | |
|---|---|---|
| CN | 207822548 U | 9/2018 |
| DE | 1444326 A1 | 12/1968 |
| DE | 19535817 A1 | 4/1996 |
| DE | 10024418 A1 | 11/2001 |
| EP | 2039408 A1 | 3/2009 |
| EP | 2039409 A1 | 3/2009 |
| EP | 3524331 A1 | 8/2019 |
| JP | S39-003350 Y | 2/1964 |
| JP | S49-029648 Y | 8/1974 |
| JP | S59-209605 A | 11/1984 |
| JP | H02-111403 A | 4/1990 |
| JP | H07-185201 A | 7/1995 |
| WO | 93/18083 A1 | 9/1993 |
| WO | 2005/030358 A1 | 4/2005 |
| WO | 2008/104144 A3 | 11/2008 |
| WO | 2013/171060 A1 | 11/2013 |

OTHER PUBLICATIONS

Jun. 29, 2021 Office Action issued in Japanese Patent Application No. 2020-135748.

* cited by examiner

DEVICE FOR THE THERMAL TREATMENT OF MATERIAL, IN PARTICULAR FOR THE THERMAL SEPARATION OF MATERIAL COMPONENTS CONTAINED IN THE MATERIAL

The invention relates to a device for the thermal treatment of material, in particular for the thermal separation of material components contained in the material, in accordance with the preamble of claim 1 and, in particular, a short-path evaporator.

Short-path evaporators are used for the thermal treatment of temperature-sensitive materials with the aim of concentrating or degasifying the material or of selectively distilling the gaseous material components that escape from the material during this process.

The principle of short-path evaporation is based on heating a mixture of substances fed to the evaporator, referred to below as "material", on a treatment surface forming an evaporation surface and on condensing the gaseous material components that escape during this process on a condenser surface situated opposite the evaporation surface. During this process, the spacing selected between the evaporation surface and the condenser surface is very small in order to minimize pressure losses along the path from the evaporation surface to the condenser surface. This makes it possible to operate in short-path evaporators with very low operating pressures down to 0.001 mbar and correspondingly low boiling temperatures.

Illustrative short-path evaporators are described in EP 2 039 408 A1 and EP 2 039 409 A1, for example.

Thus, in EP 2 039 408 A1, there is a description specifically of a short-path evaporator which, above the condenser, has a disk-shaped rotor plate, which is rotatable about the longitudinal axis of the housing, which rotates during operation and on the peripheral edge region of which there is arranged a suspension assembly with distributing means arranged circumferentially thereon for distributing the material supplied on the evaporation surface. Specifically, these distributing means can, according to EP 2 039 408, be in the form of wiper blades, which are arranged at regular intervals in the circumferential direction and offset relative to one another in the axial direction in such a way that they lie on a spiral extending around the longitudinal axis.

The short-path evaporators described in EP 2 039 408 A1 and EP 2 039 409 A1 are designed for relatively low-viscosity mixtures of substances, which flow downward on the evaporation surface owing to gravity and are spread continuously on the evaporation surface in this way, thereby increasing the dwell time.

DE 1 444 326 A furthermore describes a device for evaporating, separating or distilling liquids having a heated support surface, which is rotationally symmetrical with respect to a vertical axis and on which the liquid can flow downward in a thin layer. To spread the liquid layer on the support surface, use is made here of a spreading member which extends in the form of a helical line, which is rotatable about the axis and to which axial vibrations can be imparted during the rotary motion, producing interference waves in the liquid layer.

However, the short-path evaporators described in EP 2 039 408 A1, EP 2 039 409 A1 and DE 1 444 326 are unsuitable or of only limited suitability for materials or mixtures of substances of high viscosity. Thus, the upper viscosity limit for conventional short-path evaporators is normally about 25 Pas since it must be ensured that the stock to be treated can flow downward under the action of gravity.

DE 195 35 817 A1 is concerned with the thermal treatment of high-viscosity products while simultaneously ensuring uniform distribution of the stock to be treated on the treatment surface. In this context, a device is described which has a core tube, to which angular web plates arranged parallel to the rotor axis are welded, on the outer side of which plates blade elements are arranged in a helical pattern. Although the dwell time of viscous material can be shortened thereby in comparison with the distributing elements or spreading members described above, the device is of only limited suitability for treating very high-viscosity materials, especially materials with a viscosity well above 25 Pas.

According to the device described in DE 195 35 817 A1, the rotor consists of two coaxial rotor units. In an outer chamber, the vapors are conducted in a co-current flow with the product, with the vapors being separated from the product at the deflection into an inner chamber. The gaseous volatile components are then let out in the upper part of the device via a vapor outlet connection. The pressure in the outer chamber and in the inner chamber is approximately 0.5 to 1.0 mbar here.

However, there is the need for short-path evaporators which cover the processing of materials within a very wide range of viscosities, in particular a range of 0.1 mPas to 15 000 Pas, at operating pressures in the entire fine vacuum range (1 to 0.001 mbar) and at the same time ensure high product quality.

It is therefore the object of the invention to make available a device for the thermal treatment of material, in particular for the thermal separation of material components contained in the material, which makes it possible, for the materials to be treated, to achieve good separation of material components contained in the material even when the operating pressures are very low. In particular, the effect which is therefore intended to be achieved is that a good separating efficiency or high product quality is achieved even for temperature-sensitive materials or materials of high viscosity, for which operating pressures are applied in the device in the fine vacuum range.

The object according to the invention is achieved by the device as claimed in claim 1. Preferred embodiments are given in the dependent claims.

Although the device for the treatment of materials can be used within a very wide range of viscosities, it is designed in particular for the thermal treatment of viscous material, in particular for the thermal separation of material components contained in viscous material. It relates in particular to a short-path evaporator.

The device comprises a housing having a heatable housing jacket, which surrounds a treatment chamber and forms a rotationally symmetrical treatment surface extending in the axial direction. Typically, the device is aligned vertically; the axial direction to which reference is made in the context of the present invention thus generally corresponds to the vertical.

A material inlet for introducing the material to be treated into the treatment chamber is arranged in an inlet region of the housing, while a material outlet for discharging the material out of the treatment chamber is arranged in an outlet region of the housing. In the case of the vertically aligned device, this material outlet is thus arranged in a lower region of the housing, while the material inlet is arranged further up.

The device furthermore has a drivable rotor, which is arranged in the treatment chamber and extends coaxially, for producing a material film on the treatment surface, wherein the rotor comprises a shaft, arranged in a manner distributed over the circumference of which are spreading elements, the radially outermost, i.e. peripheral, end of which is spaced apart from the treatment surface. Typically, the spacing between the peripheral end of the spreading elements and the treatment surface can be in the range of from approx. 0.5 to 5 mm, preferably 1 to 5 mm, while, in some cases, especially in the case of devices with a very large volume, it can be up to 8 mm.

The device furthermore comprises a condensation space, in which a, usually static, condenser is arranged and into which gaseous material components escaping from the material during the thermal treatment can pass. As a rule, the shaft is in the form of a hollow shaft which surrounds the condensation space and which has through openings for the gaseous material components escaping out of the material during the thermal treatment. The hollow shaft is generally of cylindrical, in particular circular-cylindrical, configuration, wherein the through openings are arranged in the lateral surface of the cylinder. It is also conceivable for the condenser to be arranged in a lower region of the device downstream of the rotor in the transport direction of the material.

The device furthermore comprises a condensate outlet for discharging the material components condensed in the condensation space, and a vacuum connection, which is fluidically connected to the condensation space, for removing the uncondensed material components. The vacuum connection therefore constitutes the vapor outlet of the device. According to the invention, the vacuum connection is arranged in a region of the housing that lies downstream of the treatment surface, as viewed in the transport direction of the material. Since the device is generally aligned vertically and the transport direction runs downward, the region in which the vacuum connection is connected therefore corresponds to the lower region of the housing. For the situation in which the condenser is arranged in a condensation space surrounded by a hollow shaft, the vacuum connection is therefore also arranged in a region of the housing below the condenser. The device is therefore differentiated from the known devices which are described, for example, in DE 195 35 817 A1 and which have a vapor outlet connection in the upper part of the housing.

According to the present invention, the arrangement of the vacuum connection makes it possible for a flow path of the gaseous component escaping from the material to be predetermined. This is of relevance specifically in the case of very low operating pressures of less than 1 mbar since a continuum flow is no longer present, in which the evaporation space is uniformly filled with gas molecules and the gas or the individual molecules preferably move in one direction. It has thus been established that, in an process pressure range of 1 to 0.001 mbar, i.e. what is referred to as the fine vacuum, a Knudsen flow is present, in which the gas molecules no longer interact with one another and a preferred flow direction is no longer present.

The predetermination of the flow path obtained according to the invention increases the probability, in a process pressure range of 0.001 to 1 mbar, with which the gas molecules will strike against the condenser located on the inside, and therefore ultimately a high condensate quality will be able to be achieved.

According to a particularly preferred embodiment, the vacuum connection is configured in such a manner that a vacuum can be connected directed to the condensation space. The term "vacuum" refers here especially to a fine vacuum in the pressure range from 1 to 0.001 mbar. The vacuum connection is generally sealed off from the treatment chamber.

Furthermore, it is preferred for a vacuum connection to be arranged only in a region of the housing that lies downstream of the treatment surface, as viewed in the transport direction of the material. In other words, in this embodiment, a vacuum connection is not arranged in the upper region of the housing.

Over the course of the present invention, it has been shown that the advantages of a high condensate quality that are achieved by the arrangement according to the invention of the vacuum connection are also possible for devices having a rigid wing rotor or high viscosity rotor. Such rotors permit the processing of materials of very high viscosity and furthermore have the advantage that the problem of material abrasion, as may occur in the case of movable wiper elements because of the possible contact with the housing inner wall, is not present.

Depending on the overall size and with regard to the processing of materials of high viscosity, the device can preferably have a lower rotor bearing in which the rotor is mounted in its end region on the material outlet side. The device therefore differs from the known devices, in which the rotor is mounted in a cantilevered or suspended manner on the drive side, i.e. above the treatment chamber or the process zone, and does not have any further bearings. The lower rotor bearing generally absorbs both axial forces and radial forces. Typically, according to this embodiment, an upper rotor bearing on the drive side is present in addition to the lower rotor bearing.

In view of obtaining an improved separating efficiency during the processing of materials in particular of high viscosity, it is furthermore preferred that the lower rotor bearing is arranged centrally since this permits improved radial guiding in comparison to a circumferential bearing having, for example, Teflon sliding blocks. Owing to the improved radial guiding, according to this embodiment, apart from rotors having movable or spring-loaded wiper blades, rigid wing rotors can easily also be used. The improved guiding or limiting of the degrees of freedom thus prevents contact from occurring between the rigid spreading elements and the housing inner wall or the treatment surface. In addition, vibrations possibly occurring during the rotation can be effectively prevented because of the lower central rotor bearing which is present.

According to a further preferred embodiment, the material outlet leads downward in the axial direction and in particular is in the form of a discharge device adjoining the treatment chamber in the axial direction. The central arrangement of the material outlet according to this embodiment also promotes the fact that materials of very high viscosity can be processed with high separating efficiency by the device according to the invention.

Specifically, the discharge device can be present, for example, in the form of a hopper with a conical inlet container and a level-controlled pump. Thus, the device is further distinguished from previously known short-path evaporators, such as that shown in EP 2 039 409, in which the material is discharged laterally from the treatment chamber, generally via a trap.

According to a special embodiment, a discharge aid which is attached and driven from below, in particular a feed screw, which feeds the product to a laterally arranged pump, can be provided. According to another special embodiment, it is conceivable for the discharge aid to directly adjoin the bearing described and to feed the treated material at the same speed as the rotor to a discharge pump arranged at the bottom.

In this way, a relatively high discharge rate is ensured and an accumulation ahead of the material outlet is minimized or prevented, even in the case of a very high viscosity of the fully treated material to be discharged.

According to a specific embodiment, at least some of the spreading elements are configured as delivery elements, which impart a delivery component to the material in the direction from the material inlet to the material outlet, that is to say generally downward. However, it is also conceivable for the spreading elements to have primarily a distributing function.

Specifically, the term "spreading element" includes wings, blades or teeth which are attached fixedly to the rotor and are immovable in relation to the rotor, as are present in what are referred to as rigid wing rotors. In addition, the term covers movable, in particular spring-loaded wiper elements, such as, for example, movable wiper elements of the "Sambay" type or wiper blocks of a "Smith" rotor, which are pressed against the treatment surface by the centrifugal force during the movement of the rotor.

According to another specific embodiment, at least in a longitudinal section of the rotor, especially in a central longitudinal section, some of the spreading elements are configured as delivery elements and some as distributing elements, which protrude from the hollow shaft and which comprise teeth, the shearing edge of which encloses an angle of less than 45° relative to the axial direction.

Typically, therefore there are spreading elements which primarily have a delivery function and which thus form a delivery element, and spreading elements which primarily assume a distributing function and thus form distributing elements.

On the one hand, the presence of the delivery elements ensures that even materials of very high viscosity can be conveyed through the treatment chamber at a sufficiently high delivery rate and thus the dwell time or treatment duration during which the material is exposed to elevated temperatures and high shear rates can be kept sufficiently short. On the other hand, the presence of the distributing elements ensures very good distribution and optimum surface renewal on the treatment surface, even when the material has a very high viscosity.

Finally, it is thus possible to achieve optimum treatment, in particular a high degasification rate, of material of very high viscosity and, at the same time, to limit the energy input to the material to a level at which the material does not suffer any damage and, in particular, at which there is no thermally induced degradation.

The described device thus makes it possible to provide optimum treatment, in particular degasification and, in some cases, also reaction, whether in combination with the degasification or independently thereof, of materials with a high viscosity. More specifically, the device according to the invention is suitable for the treatment of polymers of very high viscosity, with which there is a need, after the polymerization reaction, to separate out solvents still contained in the polymer and/or excess monomers or oligomers with a relatively high boiling point or those formed unintentionally during a reaction. Specifically, by means of a device according to the invention, in which there is a circumferential bearing for the mounting of the rotor, materials with a viscosity of up to 15 000 Pas can be treated. For the preferred embodiment which is described below and in which the device has a lower central rotor bearing for the mounting of the rotor, the viscosity of the material to be treated preferably lies within a range of 1 to 5000 Pas, particularly preferably of 50 to 2000 Pas.

The device according to the invention is especially advantageous for the treatment of polymers based on renewable raw materials since these are generally relatively temperature-sensitive. The device according to the invention is also especially advantageous for the treatment of polymers and materials of high viscosity which should have a particularly high level of degasification for applications in the sectors of medicine, cosmetics and food technology. As mentioned, the device is particularly well-suited precisely for treating relatively temperature-sensitive materials because the heat energy to which the material is exposed can be set in an optimum manner by virtue of the possibility of selecting a relatively low temperature and short dwell time on the treatment surface.

Typically, the viscosity of the material to be treated with the device according to the invention lies within a range of from 100 to 15 000 Pas, in particular from 1000 Pas to 10 000 Pas and, more specifically from 1500 Pas to 6000 Pas. Here, the viscosity values are based on the operating temperature and a shear gradient of $D=10$ sec$^{-1}$.

As regards the operating temperature of the device according to the invention, this is generally in a range of from 40 to 400° C., in particular from 150 to 350° C. and, more specifically, from 20 to 300° C.

The feature indicated above, namely that, "at least in a longitudinal section of the rotor", some of the spreading elements are configured as delivery elements and some as distributing elements means that embodiments are included in which this design of the spreading elements is implemented over the entire length of the rotor and also embodiments in which this is implemented only over part of the rotor length, in particular only in a central longitudinal section.

As mentioned, the distributing elements comprise teeth which project from the hollow shaft. It is conceivable here that the teeth project in an at least approximately radial direction from the hollow shaft or, alternatively, project at an angle to the radial direction. In general, the teeth are each fixed on one of a plurality of axially extending flanges arranged on the hollow shaft.

According to a preferred embodiment, the shearing edge of at least some of the teeth encloses an angle in a range of from 0 to 40° relative to the axial direction.

Depending on the respective application, there may be a particular preference for said angle to be in a range of from 10 to 30°, and more specifically to be about 20°. According to this embodiment, the distributing elements thus also impart to the material to be treated a delivery component in a direction toward the material outlet, wherein this delivery component is smaller than that of the delivery elements. It is conceivable for this embodiment, for instance, for the teeth to have a proximal subsection which lies in a plane extending parallel to the axial direction and via which the teeth are flanged on, and a distal subsection, which lies in a plane extending obliquely to the axial direction and the radially outer end of which forms the shearing edge.

Depending on the application, there may be a preference, as an alternative to this embodiment, for the shearing edge of at least some of the distributing elements to enclose an angle smaller than the abovementioned angle and, in particular, to extend at least approximately parallel to the axial direction, that is to say to enclose an angle of about 0° relative to said direction. In the last-mentioned case, the distributing elements are completely neutral in terms of delivery and have an exclusively distributing function. The specific configuration of the distributing elements which is chosen ultimately depends on the material to be treated and can vary within the definition according to the invention.

As regards the delivery elements, these comprise at least one delivery rib, the radial outer edge of which generally encloses an angle greater than 45° relative to the axial direction. Thus, even with a material of very high viscosity, the delivery component imparted by the delivery element is sufficiently high to obtain a desired delivery rate through the treatment chamber.

The radial outer edge of the delivery rib preferably encloses an angle of at most 65° relative to the axial direction. More specifically, the angle lies in a range of from 50° to 60°.

Apart from the fact that the delivery effect of a delivery element is determined by the angle of incidence of the radial outer edge of a delivery rib, the delivery action of the delivery element can additionally be set by means of the number of delivery ribs or the spacing between the delivery ribs that follow one another in the axial direction.

According to a particularly preferred embodiment, the delivery elements each comprise an angular web plate, which is arranged at least approximately parallel to the axial direction and on the outer side of which at least one helically extending delivery rib is arranged. By virtue of the angular shape, the web plate is thus divided into a first and a second web plate surface, which lie in planes extending obliquely to one another.

Apart from the outer edge of the delivery rib, the angular shape of the web plate in this embodiment results in a shearing edge which generally extends axially and which is set back relative to the radial outer edge of the delivery rib and is thus arranged at a greater distance from the treatment surface than said edge. Thus, according to this embodiment, the delivery element also contributes to optimum distribution of the material on the treatment surface.

According to another preferred embodiment, the distributing elements are arranged alternately with the delivery elements in the circumferential direction of the rotor since very uniform distribution of the material on the treatment surface can thereby be ensured.

Moreover, there may be a preference to design the spreading elements of the rotor exclusively as delivery elements in the region of the material inlet in order to achieve a high delivery rate particularly in this region and thus counteract an accumulation of material.

The process pressure range present in the device or in the treatment chamber depends on the respective objective of the device and is typically in a range of from 0.001 mbar to 50 mbar.

For a device which is configured primarily to achieve as high as possible a degasification rate, even at moderate temperatures, there is preferably a pressure in the range of from 0.001 mbar to 1 mbar, particularly preferably of 0.001 mbar to 0.005 mbar, in the treatment chamber during operation.

In the case of such a low process pressure or such a high vacuum, a pre-degasification stage is preferably provided, which separates out a large portion of the volatile constituents of the material to be treated before the material is introduced into the treatment chamber. In this way, the gas volume flow is kept within a manageable range. Immediately before being introduced, the material to be treated is preferably in equilibrium with the gas phase.

It is, of course, also possible, depending on the application, for the process pressure of the device to be higher if this makes it possible to ensure good treatment, in particular sufficient gasification.

A device which is configured primarily for removing large amounts of vapor is, for example, also conceivable, with it being possible, owing to the configuration according to the invention of the device, to dispense with guiding the vapors through narrowing tubes, which results in high pressure losses in the case of a device having an externally arranged condenser. For this device configured primarily for removing large amounts of vapor, the process pressure in the treatment chamber may be higher and may be up to 50 mbar.

According to a preferred embodiment and especially for materials of low viscosity, the device according to the invention also has a distributing device for distributing the material, which is introduced via the material inlet, to the treatment surface, wherein the distributing device is in the form of a distributing disk which is arranged on the rotor and has a disk base and a disk wall which radially surrounds the disk base and preferably runs substantially perpendicularly thereto, and the disk wall has openings which are spaced apart from one another in the circumferential direction. During operation, the material which is introduced and passes onto the disk base is pressed radially outward during the rotation of the rotor, with said material passing through the distributing openings onto the treatment surface. Spilling over of the introduced material is therefore prevented and a uniform distribution of the material over the extent of the treatment surface is obtained, which results in improved use of the treatment surface and ultimately in increased product quality and efficiency of the device. In order additionally to prevent the risk of spilling over, it may be preferred for the upper end of the disk wall to have a projection projecting radially inward.

By virtue of the fact that the material is exposed to a sharp pressure reduction upon introduction into the treatment chamber, gaseous components can nevertheless escape instantaneously from the material (in the course of "flash" evaporation), which can lead, in turn, to entrainment of material. According to a preferred embodiment, in order to avoid entrained material reaching the hollow shaft and ultimately entering the condensation space and being able to contaminate the condensate, the device has a spray protection jacket completely surrounding the hollow shaft in the region of the material inlet.

According to a very simple and therefore preferred embodiment, the spray protection jacket is in this case formed by the delivery elements and by plates, each of said plates connecting two circumferentially successive delivery elements. For the abovementioned embodiment in which the delivery elements each comprise an angular web plate having at least one helically extending delivery rib on the outside, it is thus possible for a first top surface side of a first delivery element to be connected to the second top surface side of a second delivery element preceding the first delivery element in the direction of rotation, as explained further in conjunction with the figures.

According to another preferred embodiment, in order to prevent an accumulation of material in the region of the material outlet too, the spreading elements of the rotor are designed exclusively as delivery elements in this region too.

The number of spreading elements distributed in the circumferential direction is generally between 4 and 80, preferably between 6 and 48, and most preferably between 8 and 32. Very good delivery and distribution of the material during the treatment thereof on the treatment surface can thereby be achieved. Here, the optimum number of spreading elements depends on the respective application and on the size or diameter of the rotor.

As is likewise explained in the context of the figures, according to a particularly preferred embodiment, the rotor has, between the inlet region and the outlet region, in which all the spreading elements are configured as delivery elements, a central region, across which delivery elements extend as an axial extension of some of the delivery elements of the inlet region. In the central region, these each alternate with a distributing element, which is in each case likewise arranged as an axial extension of a delivery element of the inlet region.

As mentioned, according to the invention, the condenser is arranged in a condensation space, which is surrounded by the hollow shaft.

According to a particularly preferred embodiment, the condenser comprises an inner tube and an outer tube concentrically surrounding the inner tube. Both the outer tube and the inner tube have an outer wall and an inner wall, which are spaced apart from one another, at least in some region or regions, and in this way form an inner-tube cooling-medium circulation duct in the inner tube and an outer-tube cooling-medium circulation duct in the outer tube. In this case, the inner-tube cooling-medium circulation duct and the outer-tube cooling-medium circulation duct are fluidically connected to one another. Here, the condenser is generally configured in such a way that a cooling-medium feed line opens into one of the two cooling-medium circulation ducts, that is to say, for example, into the outer-tube cooling-medium circulation duct, and a cooling-medium outlet leads away from the other cooling-medium circulation duct in each case, that is to say, in the example mentioned, from the inner-tube cooling-medium circulation duct. Typically, the cooling-medium feed line and the cooling-medium outlet are arranged in a lower region of the condenser, and the connection between the cooling-medium circulation ducts is arranged in an upper region. During operation, the cooling medium thus flows upward from a lower region of one outer/inner tube, crosses into the respective other tube in an upper region and, from there, flows downward in the inner or outer tube.

It is furthermore conceivable that the inner tube and the outer tube are both formed by a plate in which the inner wall is spot-welded to the outer wall, wherein the hollow buffer resulting between the inner wall and the outer wall serves as a cooling-medium circulation duct. In this case, welding circuits can be provided for the welded joint while, on the respective upper and lower ends of the plate, the hollow buffer is generally closed off by circumferential seams. This allows a very light and compact but nevertheless very stable configuration of the condenser.

Windows are furthermore generally arranged in the outer tube, these being intended to ensure that the gaseous components for condensation can also reach the inner tube. In this case, the windows are preferably arranged uniformly in the longitudinal and in the circumferential direction.

In comparison with the devices that are likewise encompassed by the invention, in which the condenser is designed as a shell-and-tube condenser, improved static properties are obtained in the case of the abovementioned particularly preferred embodiment of the condenser, this being particularly advantageous precisely in respect of an increased L/D ratio of the device according to the invention, which is designed for the treatment of very high-viscosity materials, as compared with conventional devices.

A shell-and-tube condenser may be preferred in the case of very large devices, for example, although the use of a shell-and-tube condenser is not excluded, even for relatively small devices. The tubes of the shell-and-tube condenser are preferably arranged in two concentric rows offset relative to one another in such a way as to leave no visible gaps.

Particularly in connection with the abovementioned embodiment, according to which there is a spray protection jacket completely surrounding the hollow shaft in the region of the material inlet, it is thus possible to ensure that the material is guided as a co-current flow in this region and that only gaseous components that have passed through the condensation space and thus cannot be condensed under the existing conditions (i.e. are volatile components) are removed. Ultimately, this results in a high condensation rate of the lower-boiling components of the treated material.

The rotor is generally cantilever-mounted, wherein, as mentioned above, it is additionally mounted in its end region on the material outlet side in a lower rotor bearing and is guided radially.

As likewise mentioned, the lower rotor bearing is preferably arranged centrally here.

It is also conceivable that the rotor has at least two bearing shoes arranged symmetrically with respect to the axis in its end region on the material outlet side, i.e. its lower end region, and is guided radially by a bearing ring of the housing, which forms a material-lubricated bearing together with the bearing shoes.

Here, the bearing shoes are preferably configured in such a way as to push material into the radial gap between the bearing ring and the bearing shoe during the rotation of the rotor. It is furthermore preferred that delivery elements, in particular delivery elements in accordance with the above description comprising an angular web plate having at least one helically extending delivery rib on the outside thereof, are additionally arranged between the bearing shoes. This ensures that the material transfer through the radial rotor guide or the bearing can be at least approximately maintained.

The radial guide in the lower region of the rotor makes possible devices with a very high L/D ratio as compared with conventional short-path evaporators, this being particularly advantageous precisely in view of the fact that the device according to the invention is designed for the treatment of materials of very high viscosity.

In general, the material inlet of the device according to the invention is in the form of a connection aligned tangentially with respect to the housing; this is in contrast with previously known short-path evaporators, such as that according to EP 2 039 409, in which the material is fed in from above, that is to say through the cover closing off the treatment chamber at the top.

As mentioned, the material outlet is preferably in the form of a discharge device which adjoins the treatment chamber in the axial direction, i.e. is arranged centrally, and therefore a relatively high discharge rate can be ensured and an accumulation ahead of the material outlet can be minimized or prevented, even in the case of a very high viscosity of the fully treated material to be discharged.

In order additionally to ensure that any accumulating material cannot reach the condenser and block the condensate outlet, the device according to another preferred embodiment has a static cover plate concentrically surrounding the condenser. In this way, material which is forced upward in the event of insufficient material discharge is kept away from the condenser by the cover plate. For this purpose, it may be preferred if the cover plate tapers conically upward. However, a cylindrical cover plate is also conceivable.

Particularly as regards the embodiment in which the cover plate is of cylindrical design, it is furthermore preferred if the rotor has, on the inside thereof, at the level of the cover plate, a bush designed as a counterpart to the cover plate and having a delivery spiral formed on the inside thereof. This bush thus rotates with the rotor. The delivery spiral has a downward delivery direction, that is to say toward the material outlet. In this case, the gap between the bush and the cover plate is smaller than the gap formed further up between the rotor and the condenser, with the result that the delivery spiral extends at a relatively short distance from the cover plate and, as a result, ultimately very effective downward material delivery and good sealing of the condensate outlet can be ensured.

Furthermore, it is conceivable that a lower part of the device that surrounds the discharge device has a larger diameter than the treatment chamber or the housing jacket surrounding the latter. Therefore, the risk that the material leads to a blockage in the narrow points of the material outlet as said material is being discharged can be minimized.

It is conceivable, for example, that the lower part has a substantially cylindrical section which adjoins the treatment chamber in the delivery direction, i.e. in the downward direction, and forms a material-collecting chamber which opens at the bottom into an adjoining discharge hopper which tapers conically downward. The cylindrical jacket circumferentially surrounding the material-collecting chamber and the jacket surrounding the discharge hopper are preferably of double-walled design and are fluidically connected to a supply of heating medium, which permits heating of said jackets and at least substantially prevents solidification of material on the inner surface thereof. The vacuum connection preferably leads away from the material-collecting chamber through the double-walled jacket thereof.

Furthermore, it is conceivable that the condenser extends into the material-collecting chamber. In this regard, it may be furthermore preferred for the condenser to be surrounded in its lowermost region by a frame which, in its lower region, is of cylindrical design and, in its upper region, tapers conically in the direction toward its upper end.

Preferably, in the cylindrical lower region of the frame passages are arranged which are distributed in the circumferential direction and by means of which the material-collecting chamber is fluidically connected to the condensation space and which have at least the same free cross-sectional area as the vacuum connection. A bay protruding radially from the cylindrical lower region of the frame can in each case be formed around the passages. The upper end of the bay is preferably configured in the shape of a gable roof, as a result of which it can be ensured that the material caught by the treatment chamber can readily flow away, which can be further assisted by heating of the frame and the bay. For this purpose, the wall of the frame and the wall of the bay can be designed as a double wall, wherein the cavity formed in this case is configured in a manner such that a heating medium flows through it.

The frame protects the condenser against material being deposited thereon and being able to solidify due to cooling. In addition, the effect achieved by the bay is that the passages toward the condensation space are not covered by material, as a result of which it is in turn ensured that a high vacuum can be effectively applied even in the condensation space.

As is explained further below in the context of the figures, both the cooling medium inlet, which is connected to the condenser, and the cooling medium outlet are in each case guided by a bay. It is thus firstly prevented that material can pass onto said lines and can solidify by cooling, which could lead to the formation of material deposits which are difficult to removed. Secondly, cooling medium or condensate is prevented from being undesirably able to be heated by any material reaching the cooling medium inlet or the cooling medium outlet.

The invention is further explained by means of the attached figures, in which.

Figure 1:
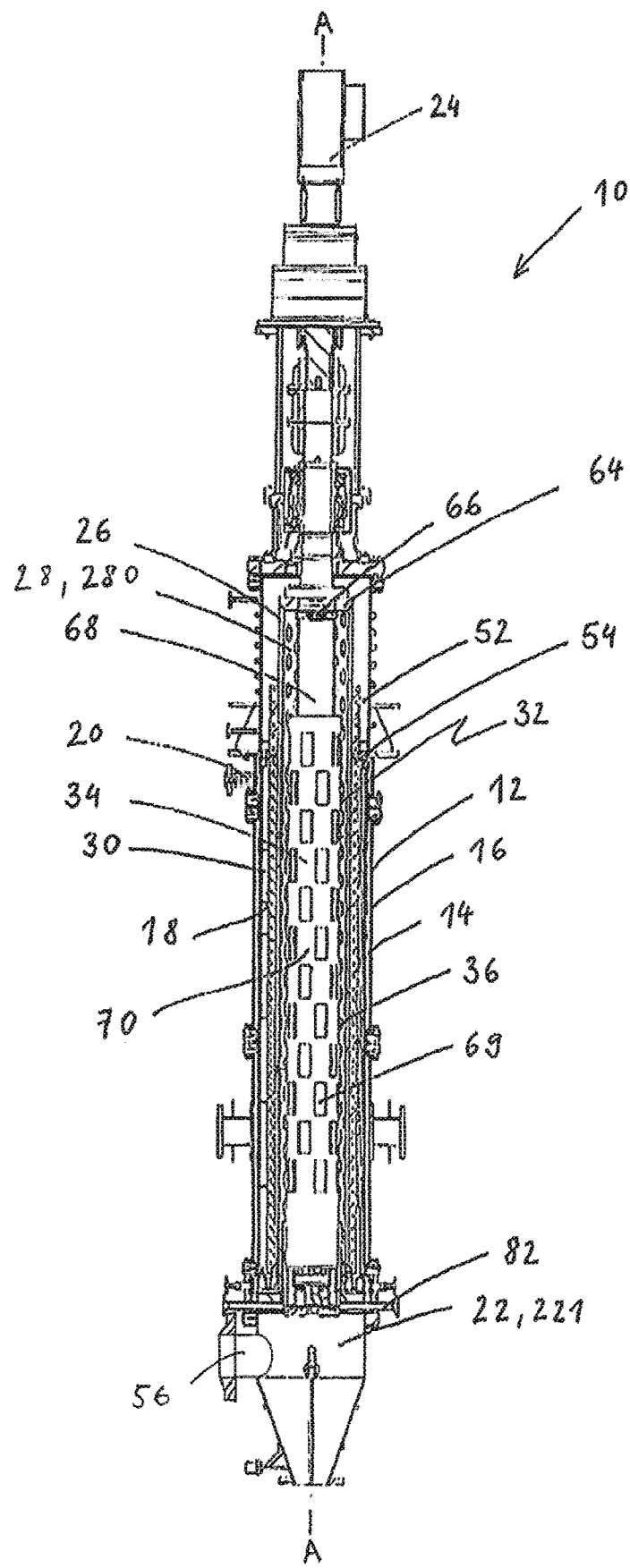
FIG. 1 shows a device according to the present invention, wherein, for the sake of clarity, the housing jacket and the hollow shaft have been removed from the illustration to an extent sufficient to open up the view of the condenser.

As shown in FIG. 1, the device 10 according to the invention comprises a vertically aligned housing 12 having a heatable housing jacket 14, which surrounds a treatment chamber 16 and, on the inside thereof, forms a rotationally symmetrical treatment surface 18 extending in the axial direction A.

The device furthermore comprises a material inlet 20, which passes through the housing jacket 14, for introducing the material to be treated into the treatment chamber 16, and a material outlet 22. The material inlet 20, which is aligned tangentially with respect to the housing jacket, is furthermore shown in FIG. 4, for example.

Arranged in the treatment chamber 16 is a co-axially extending rotor 26, which can be driven by means of a drive unit 24. Said rotor comprises a shaft 28 in the form of a hollow shaft 280, and spreading elements 30, which project from the hollow shaft 280 and are arranged in a manner distributed over the circumference thereof. In this case, the radially outermost end of the spreading elements 30 is spaced apart from the treatment surface 18 in order to spread the material out into a thin material film on the treatment surface 18 during operation, i.e. during the rotation of the rotor 26.

The hollow shaft 28 surrounds a condensation space 32, in which a static condenser 34 is arranged, and has through openings 36, through which gaseous material components escaping from the material during the thermal treatment enter the condensation space 32 to enable them to condense there on the condenser 34.

Figure 2:
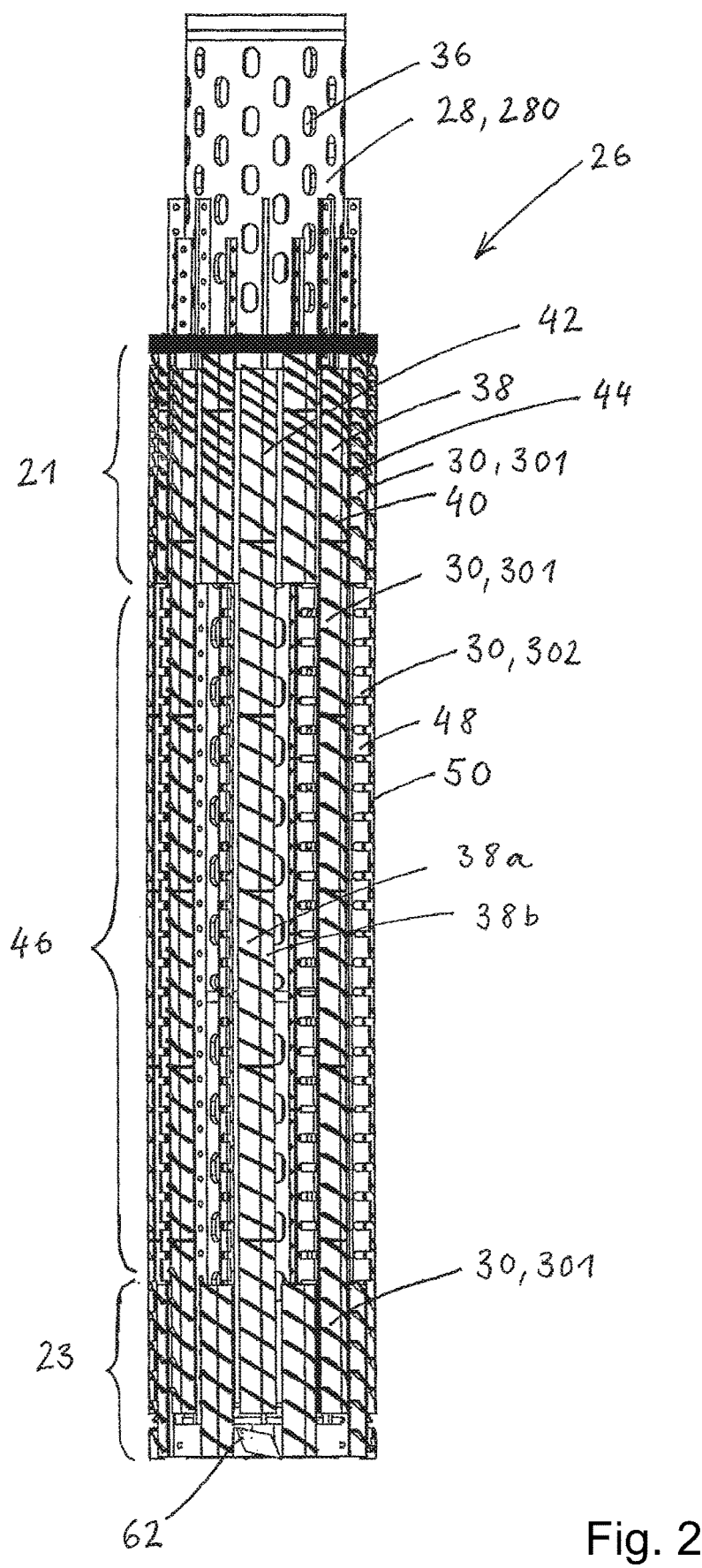
FIG. 2 shows a view of the rotor of the device shown in FIG. 1.
Figure 3:
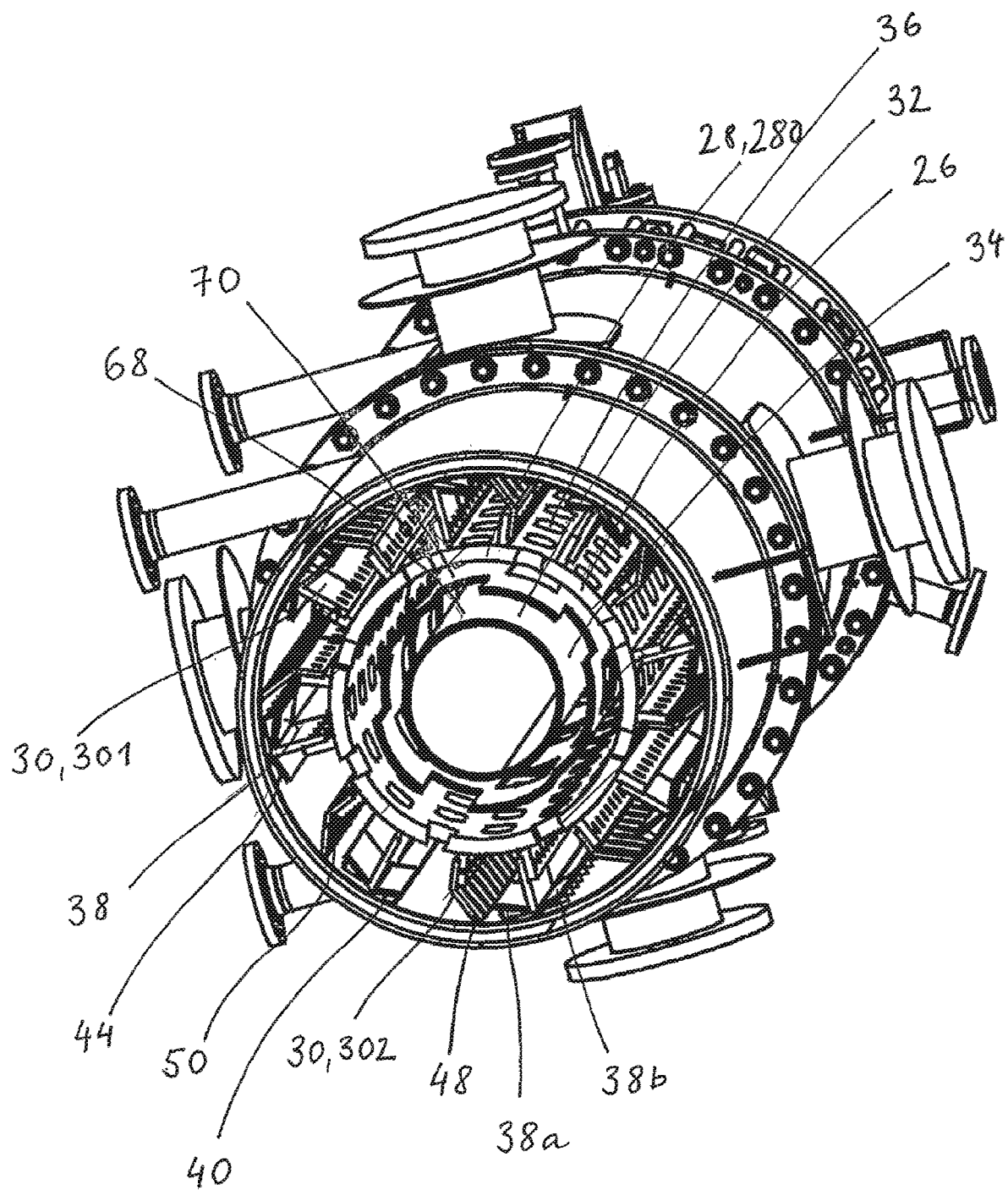
FIG. 3 shows a perspective view of a device according to the present invention sectioned transversely to the axial direction above the material inlet.
Figure 4:
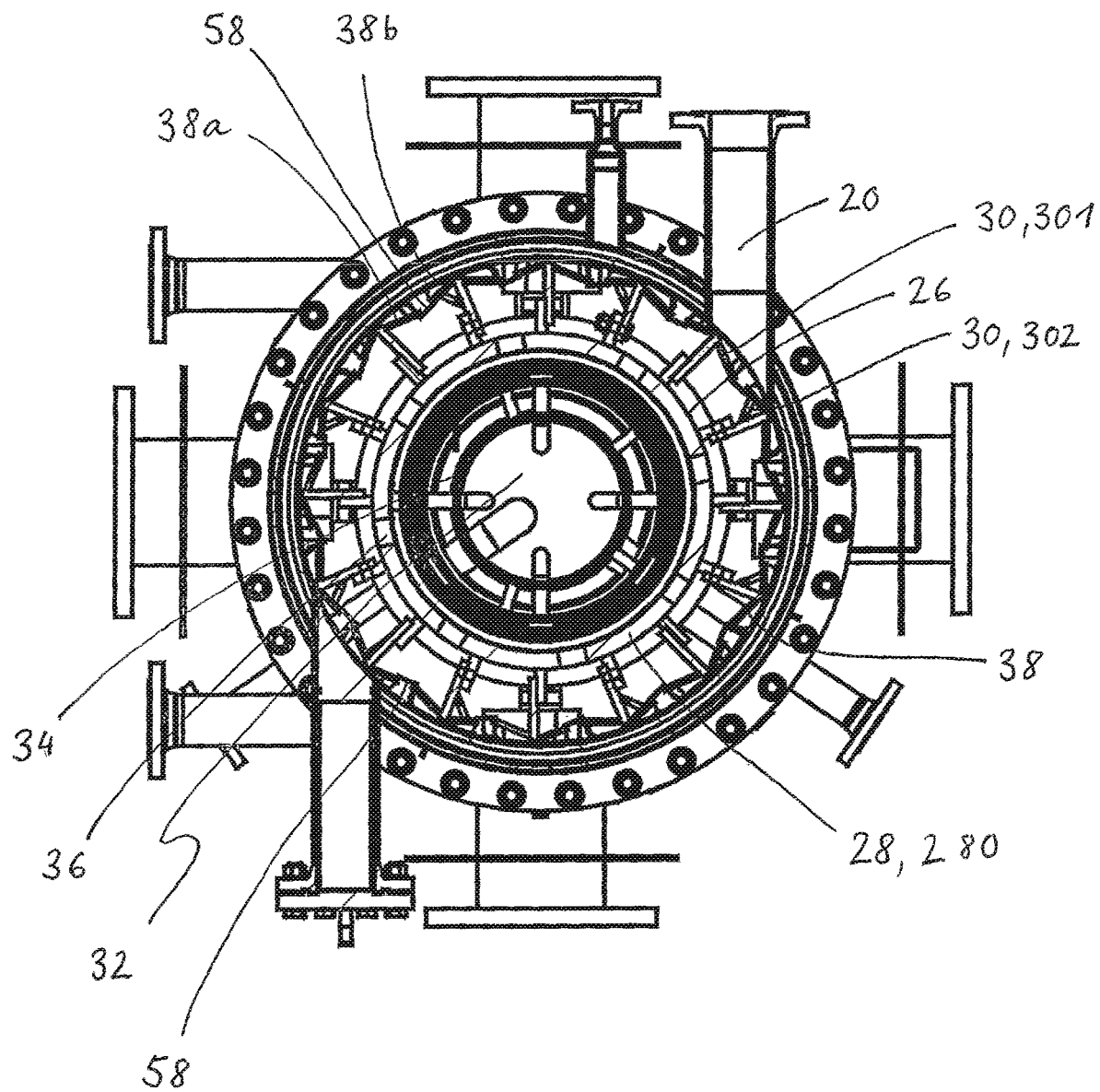
FIG. 4 shows a cross section through the device shown in FIG. 3 at the level of the material inlet.

In the rotor 26 shown in FIGS. 2 to 4, the spreading elements are arranged in a manner distributed over the circumference of the hollow shaft 280 in a total of 16 rows extending parallel to the axial direction.

In an inlet region 21, i.e. in a region of the rotor 26 at the level of the material inlet 20, and in an outlet region 23, all the spreading elements 30 are configured as delivery elements 301, which impart a delivery component to the material in the direction from the material inlet 20 to the material outlet 22. More specifically, the delivery elements 301 comprise an angular web plate 38, on the outer side of which helically extending delivery ribs 40 are arranged.

In the embodiment shown, the outer edge of these delivery ribs 40 encloses an angle of about 60° relative to the axis of the rotor.

Figure 5:
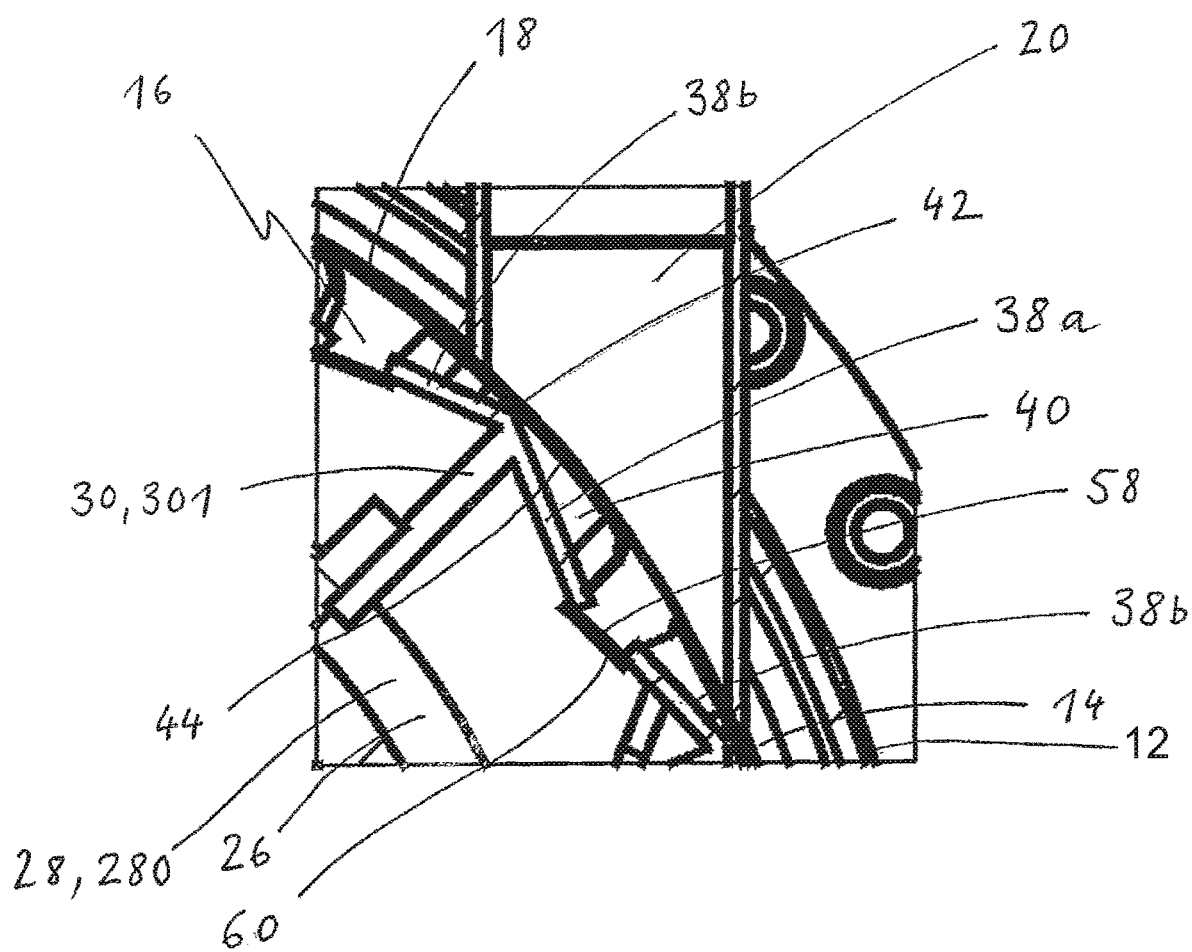
FIG. 5 shows a detail view of the delivery elements shown in FIG. 4.
Figure 6:
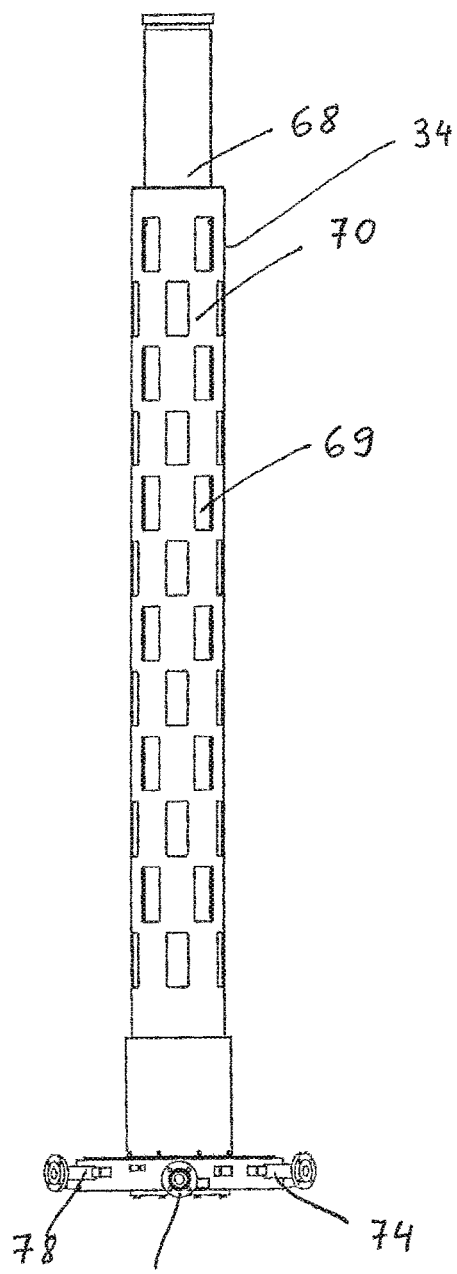
FIG. 6 shows a view of the condenser of the device shown in FIG. 1.

Moreover, the tip of the top surface of the web plate 38 forms an axially extending shearing edge 42, which is set back relative to the radial outer edge 44 of the delivery rib 40 and is thus arranged at a greater distance from the treatment surface 18 than said radial outer edge, as shown especially in FIG. 5. More specifically, the tip of the top surface of the web plate 38 or shearing edge 42 of the delivery element 301 in the embodiment shown is at a distance of about 5 mm from the treatment surface 18, while the distance between the radial outer edge 44 of the delivery rib 40 and the treatment surface is only about 3 mm.

A central region 46 is arranged between the inlet region 21 and the outlet region 23, in which all the spreading elements 30 are configured as delivery elements 301. In this central region, only half of the spreading elements distributed in the circumferential direction, that is to say, in the specific case, 8 spreading elements, are designed as delivery elements 301 forming an axial extension of the respective delivery element of the inlet region 21. These each alternate with a distributing element 302, which is in each case likewise arranged as an axial extension of a delivery element 301 of the inlet region 21.

The distributing elements 302 project radially from the hollow shaft and, in the embodiment shown, comprise a multiplicity of teeth 48 arranged axially in succession. In this case, the radially outermost end of the teeth 48 in each case forms a shearing edge 50, which extends parallel to the axis A of the rotor 26. Thus, the distributing element 302 primarily has a distributing function with a negligible or nonexistent delivery function, whereas the delivery element 301 following on in the circumferential direction primarily has a delivery function and secondarily—by virtue of the shearing edge 42 of the web plate—a distributing function. In this case, the shearing edge 50 of the teeth, which is neutral in terms of delivery by virtue of the axial alignment, is arranged at a shorter distance from the treatment surface 18 than is the case for the shearing edge 42 of the web plate of the delivery elements, as has already been mentioned and as is shown especially in FIG. 5. By virtue of the resulting narrower gap for the spreading of the material, the distributing elements 302 thus have a greater shearing action than the delivery elements 301.

Apart from the treatment chamber 16, the housing 12 has an upper part 52, which is arranged thereabove and sealed off relative to the treatment chamber and into which the rotor 26 and the condenser 34 project. More specifically, a rotating labyrinth seal 54, for instance, is conceivable for sealing between the treatment chamber 16 and the upper part 52.

According to the invention, the device has a vacuum connection 56 which is arranged in a region 19 of the housing that lies downstream of the treatment surface 18, as viewed in a transport direction of the material. The predetermination, obtained in this way, of the flow path of the gaseous material components increases the probability with which the gas molecules will strike against the condenser 34 on the inside, thus ultimately permitting the achieving of a high condensate quality.

Moreover, respective pairs of circumferentially successive delivery elements 301 are connected by a connecting plate 58 in the inlet region 21, as shown especially in FIGS. 4 and 5. More specifically, a first side 38a of the top surface of the web plate of a first delivery element is connected to the second side 38b of the top surface of the web plate of a second delivery element moving ahead of the first delivery element in the direction of rotation.

A spray protection jacket 60 that completely surrounds the hollow shaft 280 is thereby formed, said jacket preventing material which is subject to "flash evaporation" during introduction into the treatment chamber and which may be entrained by the gaseous material components escaping instantaneously from the material from reaching the hollow shaft 280 or entering the condensation space 32 and ultimately contaminating the condensate.

In the region in which a spray protection jacket 60 is formed, the material and the gaseous material components escaping during treatment are thus guided in a co-current flow while, in the central region 46 adjoining this in the delivery direction and in the outlet region 23, the material and the gaseous material components are guided in a countercurrent flow. Thus, after a first region in the delivery direction, in which allowance is made upon entry to the high vacuum or the "flash evaporation" resulting therefrom, optimum degasification is achieved in a second region since contact between the material to be treated and the enriched vapors is minimized.

The rotor 26 of the embodiment shown is cantilever-mounted and is guided radially in the outlet region 23 by a bearing ring (not shown), which forms a material-lubricated bearing together with bearing shoes 62 (shown in FIG. 2) arranged on the hollow shaft 280. For this purpose, the bearing shoes are configured in such a way as to push material into the radial gap between the bearing ring and the bearing shoe during the rotation of the rotor 26.

As mentioned, the condenser 34 is arranged in a condensation space 32, which is surrounded by the hollow shaft 280 and which is connected to the treatment chamber 16 via through openings 36 for the purpose of allowing through the gaseous material components escaping from the material during the thermal treatment and ultimately of condensing the less volatile substances contained in said material components.

The stationary condenser 34 is stabilized by means of a centrally arranged pin 66, which is held in a plate 64 closing off the hollow shaft 280 at the top. In the specifically shown embodiment, the pin is fixed at the upper end of the condenser inner tube, which projects from the outer tube.

More specifically, the condenser 34 comprises an inner tube 68 and an outer tube 70 concentrically surrounding the inner tube, wherein the inner tube 68 projects vertically beyond the outer tube 70 and has the pin 66 mentioned at its upper end. Both the inner tube 68 and the outer tube 70 have an outer wall 681 and 701, respectively, and an inner wall 682 and 702, respectively, which are spaced apart from one another in some region or regions and in this way form a gap for the circulation of a cooling medium. Thus, an inner-tube cooling-medium circulation duct 683 is formed in the inner tube 68, and an outer-tube cooling-medium circulation duct 703 is formed in the outer tube 70, wherein these are fluidically connected to one another.

Windows 69 are furthermore arranged in the outer tube, these being uniformly distributed in the longitudinal and in the circumferential direction and ensuring that the gaseous components for condensation can also reach the inner tube 68.

Figure 8:
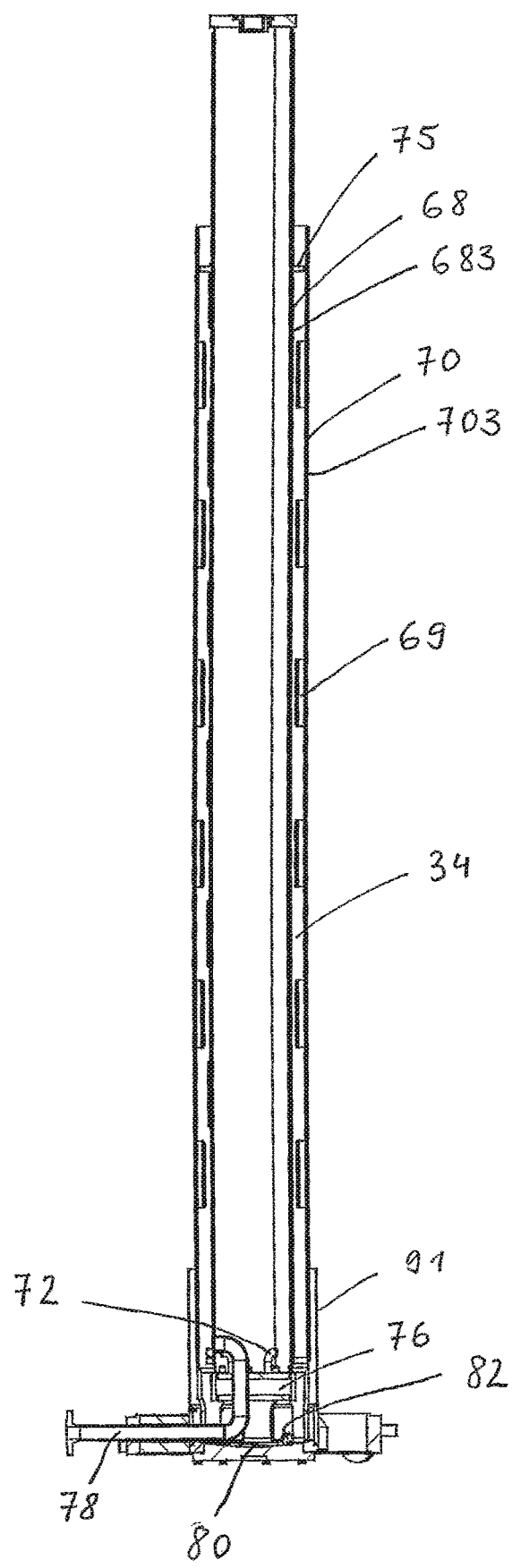
FIG. 8 shows the condenser shown in FIG. 6 in longitudinal section along the section planes shown in FIG. 7.
Figure 9:
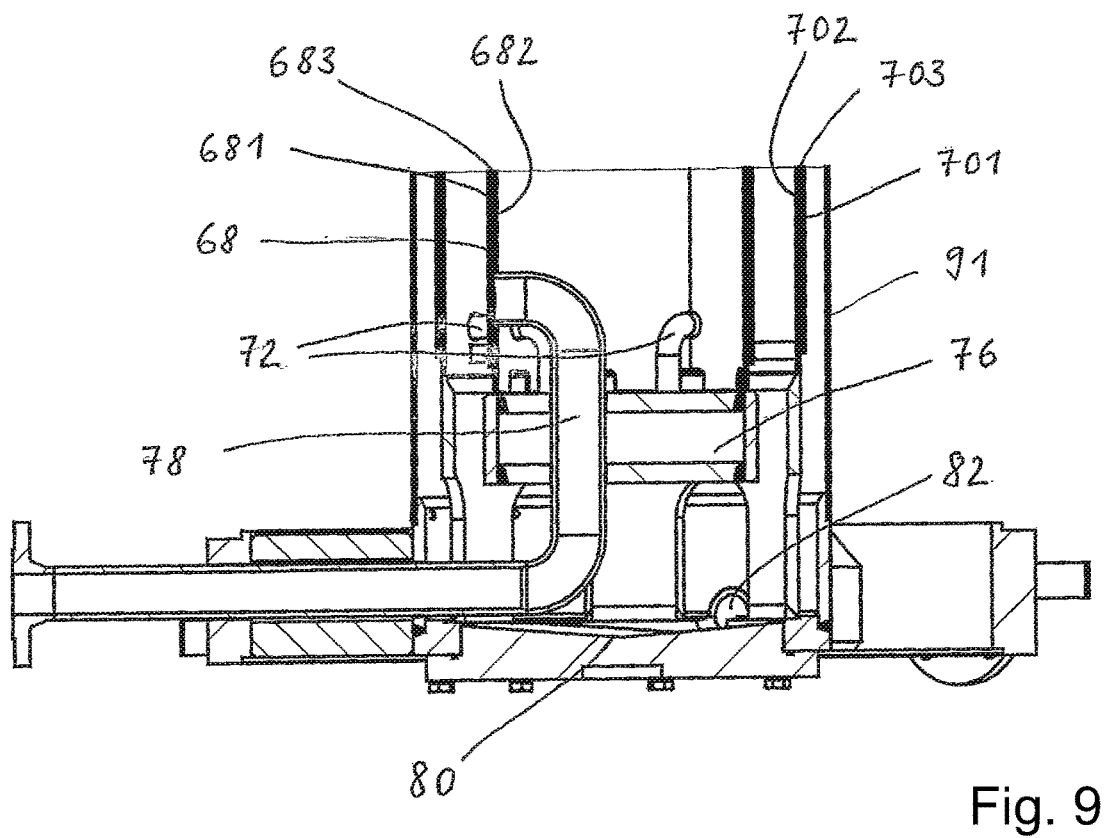
FIG. 9 shows an enlarged longitudinal section of the lowermost part of the condenser shown in FIG. 6.

In the specifically shown embodiment or the detail illustration according to FIG. 9, cooling-medium feed lines 72 from a cooling-medium reservoir 76 supplied via a cooling-medium feed 74 into the outer-tube cooling-medium circulation duct 703 open in the outlet region. From there, the cooling medium flows upward, crosses into the inner-tube cooling-medium circulation duct 683 via a connecting duct 75 shown in FIG. 8 and flows downward in said circulation duct, before it is carried out of the inner-tube cooling-medium circulation duct 683 via a cooling-medium outlet 78. In this case, the cooling-medium feed 74 and the cooling-medium outlet 78 lead away radially from the housing and are spaced apart from one another by about 120°, as shown for instance in FIG. 7 in combination with FIG. 8. During the circulation of the cooling medium, thermal energy is transferred from the gaseous material components to the cooling medium via the condenser surface, ultimately leading to the condensation of the less volatile substances on the condenser surface.

Figure 7:
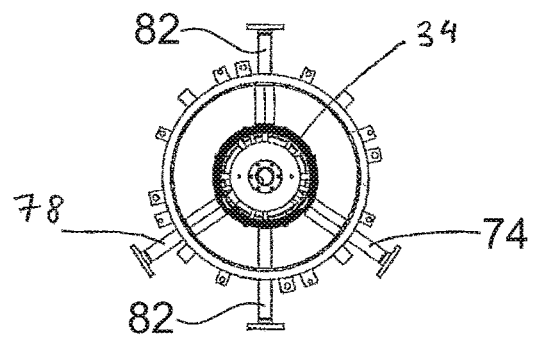
FIG. 7 shows the condenser shown in FIG. 6 in cross section.

The condensate formed during this process flows downward on the condenser surface and ultimately onto the condenser bottom 80, which is in the form of a sink or trough, from where it is discharged via corresponding condensate outlets 82 leading away from the lowermost point of the condenser bottom. More specifically, in the embodiment shown, the condensate outlets leading radially away from the housing are spaced apart by 180°, as shown in FIG. 7, for instance.

In order to remove the degasified viscous material, present after treatment, from the housing, the material outlet 22 is configured in the form of a discharge device 221 adjoining the treatment chamber and flanged thereto.

As is apparent from FIGS. 8 and 9, the device furthermore has a static cover plate 91, which surrounds the condenser 34 concentrically and which is cylindrical in the embodiment shown. Thus, material which is pushed upward when there is insufficient material discharge is kept away from the condenser 34 by the cover plate 91, thereby ultimately also making it possible to prevent blocking of the condensate outlet 82.

Figure 10:
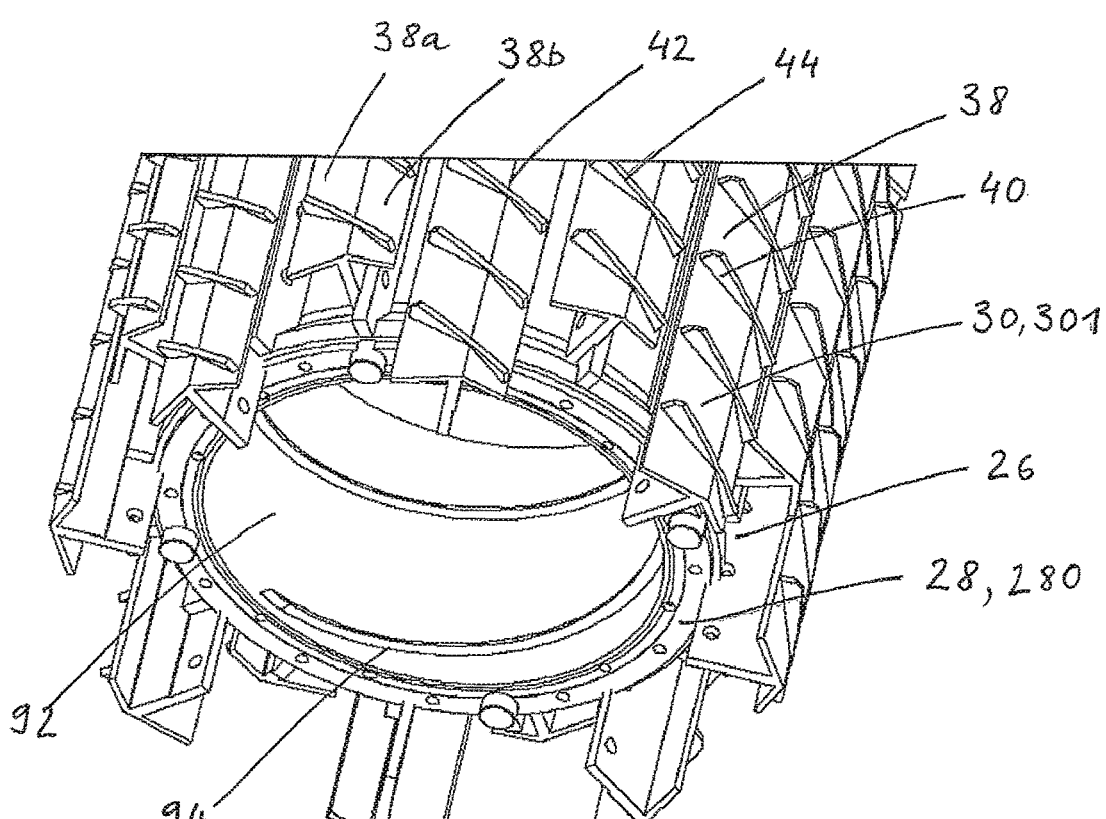
FIG. 10 shows a perspective view of the rotor end region on the material outlet side.

As shown in FIG. 10, the rotor 26 has a bush 92 on the inside thereof with a delivery spiral 94 having a downward delivery direction. This bush 92 is arranged at the level of the rotor 26 which corresponds to the level of the cover plate 91 shown in FIGS. 8 and 9 and is designed as a counterpart to the cover plate. Here, the gap between the bush 92 and the cover plate 91 is smaller than the gap, formed further up, between the rotor 26 and the condenser 34. During the operation of the device, very effective downward delivery of material and hence good sealing of the condensate outlet 82 is ensured by the bush 92 or the delivery spiral 94, which rotates with the rotor.

Figure 11:
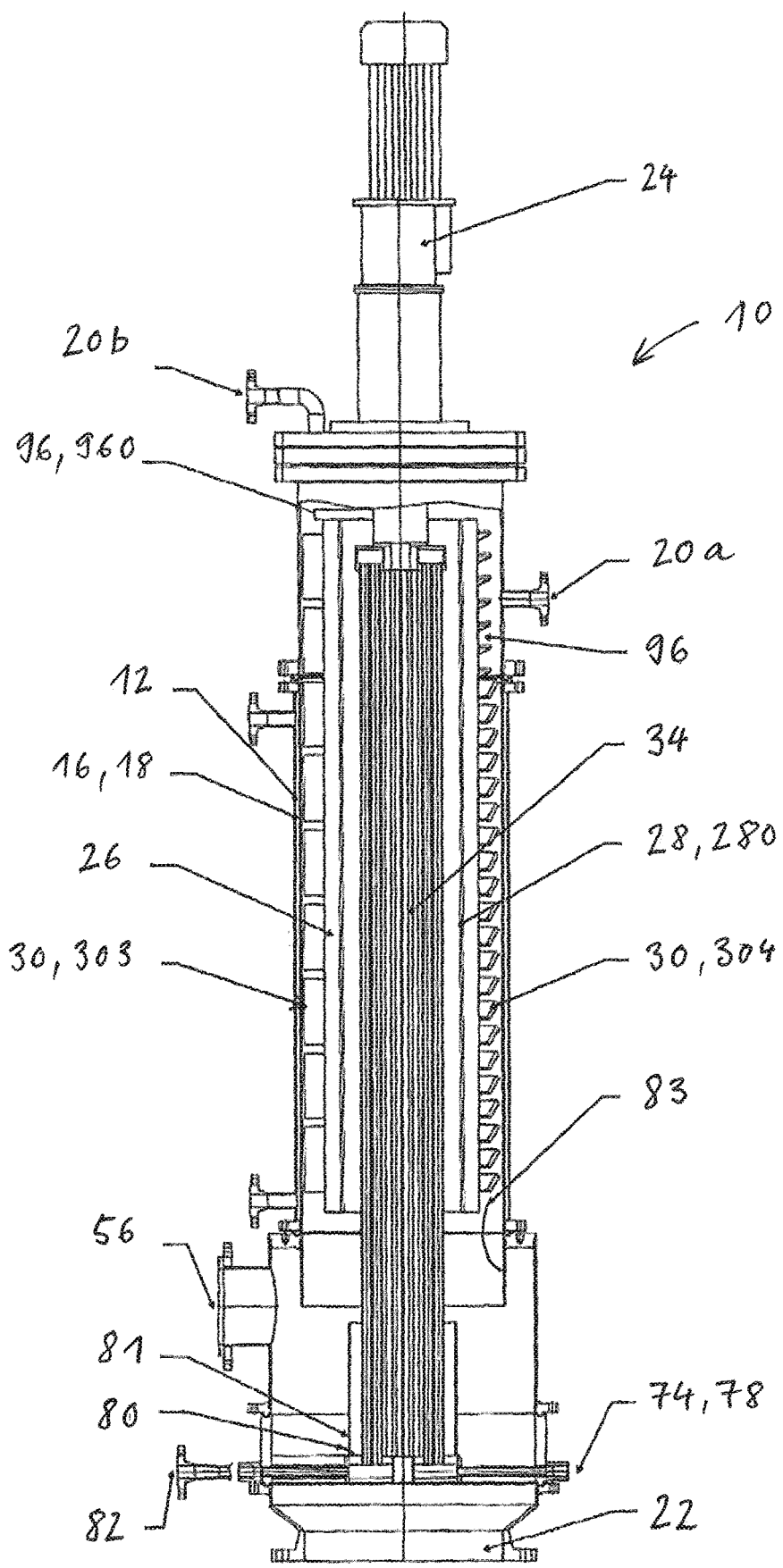
FIG. 11 shows a further device according to the present invention with a distributing device, a material outlet downward in the axial direction and with a skirt for deflecting the uncondensed gaseous material components.
Figure 12:
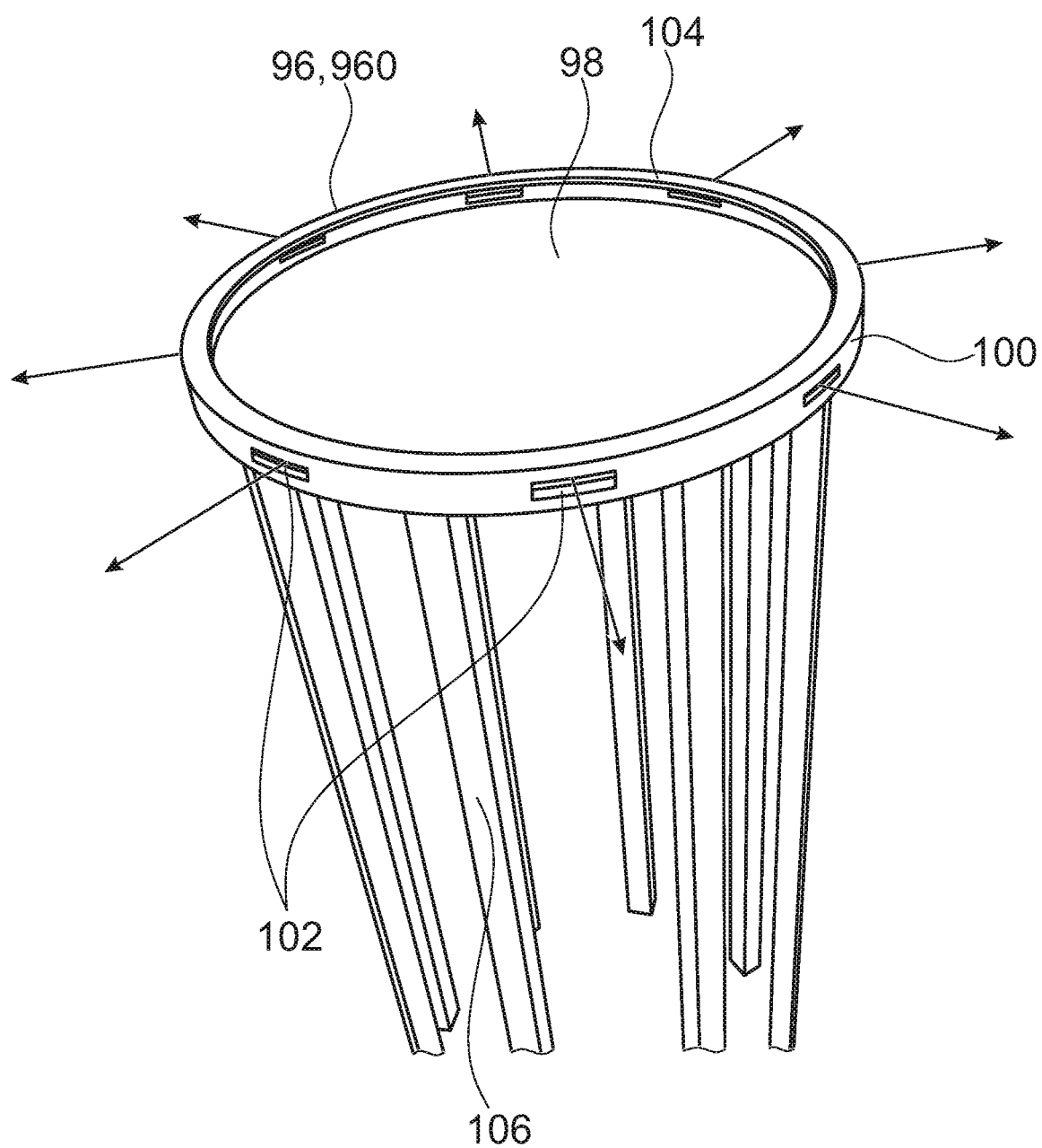
FIG. 12 shows a perspective view of a distributing device for the device shown in FIG. 11.

The embodiment according to the invention which is shown in FIG. 11 and in which the vacuum connection 56 is likewise arranged in a lower region 19 of the housing that lies downstream of the treatment surface 18, as viewed in the transport direction, differs from the device shown in FIG. 1 in that it additionally has a distributing device 96 in the form of a distributing disk 960, as is shown in FIG. 12. The distributing disk 960 has a disk base 98 and a disk wall 100 which radially surrounds the disk base and runs perpendicularly thereto and in which distributing openings 102 spaced apart from one another in the circumferential direction are provided.

Depending on whether a material of high viscosity or low viscosity is introduced into the device 10, the introduction takes place via a tangential material inlet 20a (for material of high viscosity) or via a material inlet 20b from above (for material of low viscosity). The introduced material then passes onto the disk base 98 of the distributing disk 960, from which it is pressed radially outward because of the centrifugal force during the rotation of the rotor 26 and passes through the distributing openings 102 in the disk wall onto the treatment surface 18 where it is spread by the spreading elements 30 to form a thin material film. In order additionally to prevent the risk of spilling over, the upper end of the disk wall 100 has a projection 104 projecting radially inward. In the specific embodiment, the distributing device shown in FIG. 12 is shown in conjunction with a Smith rotor which has U rails 106 into which rectangular wiper blocks are inserted (not shown).

For the sake of clarity, FIG. 11 shows different types of spreading elements of the rotor, that are intended in each case to take into consideration the different properties of the material, in particular the viscosity thereof. Specifically, the spreading elements may be in the form of movable wiper blades 303 which are pressed onto the treatment surface 18 by the centrifugal force such that high evaporation ratios with low run-off quantities can be achieved. Such wiper blades are suitable particularly for processing coating-forming materials. Alternatively thereto, the spreading elements can be present in the form of spring-loaded rectangular wiper elements. However, rigid spreading elements 304 having a shearing edge present at a predefined spacing from the treatment surface 18 are conceivable and preferred within the scope of the present invention.

In addition, the embodiment shown in FIG. 11 shows a condensate-collecting trap 81; such a trap may, of course, also be present in the embodiment shown in FIG. 1.

In order to minimize the risk that droplets may pass into the vacuum connection by being entrained with the gas flow of the uncondensed components, the embodiment shown in FIG. 11 provides a cylindrical skirt 83 which causes the gas flow emerging from the condensation space to be deflected prior to entry into the vacuum connection.

Figure 13:
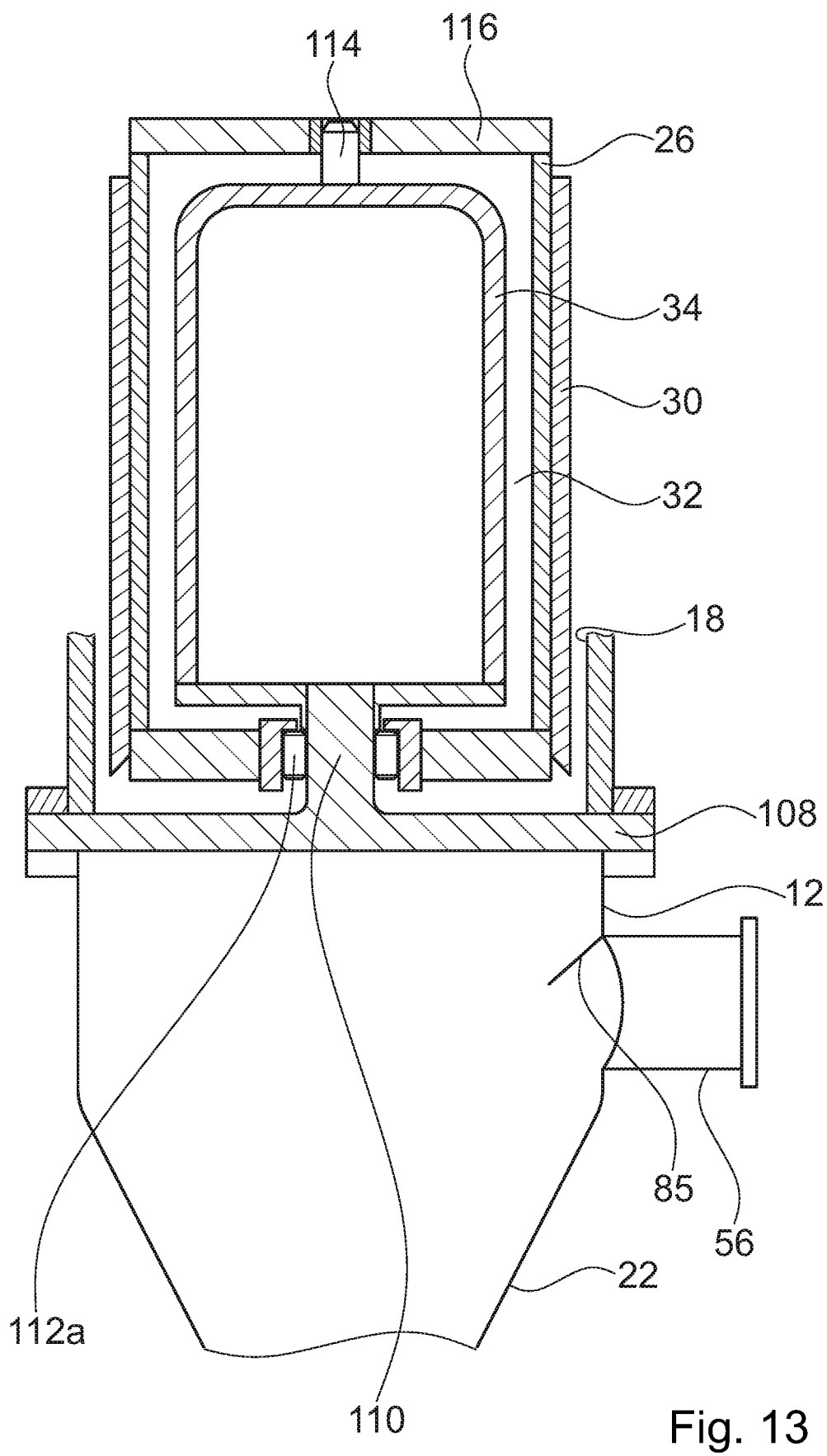
FIG. 13 shows a schematic illustration of a lower part of a device according to the invention with a first condenser guide.

According to the embodiment shown in FIG. 13, the rotor 26 is mounted centrally in a condenser support 108. Specifically, there is a static, axially aligned cylinder 110 which is connected to the condenser support 108 and which has corresponding bores for the cooling medium feed into the condensation space 32 and for the cooling medium discharge and the outflow of the condensate out of the condensation space 32. The cylinder 110 serves as a bearing pin for receiving the central rotor bearing 112a, which can be in the form, for example, of a plain bush or rolling bearing. A supporting circumferential mounting can be present in addition to the central mounting 112a. In order to improve the statics of the condenser 34, the latter has a pin 114 which is arranged at the upper end thereof and which is guided through an upper plate 116 of the rotor 26.

The condenser support 108 shown in FIG. 13 has apertures in order to ensure that both the treated material and the uncondensed gaseous components enter the lower part of the housing 12, from where they are discharged or removed via a corresponding central and downwardly leading material outlet 22 or a vacuum connection 56. It is conceivable, for example, for the condenser support 108 to have radially extending spokes and for the material to pass through the gaps between the spokes.

In order to minimize the risk that treated material or droplets entrained by the gas flow can enter the vacuum connection 56, in the embodiment shown in FIG. 13 a protective plate 85 which projects obliquely downward and covers the inlet of the vacuum connection is provided.

Figure 14:
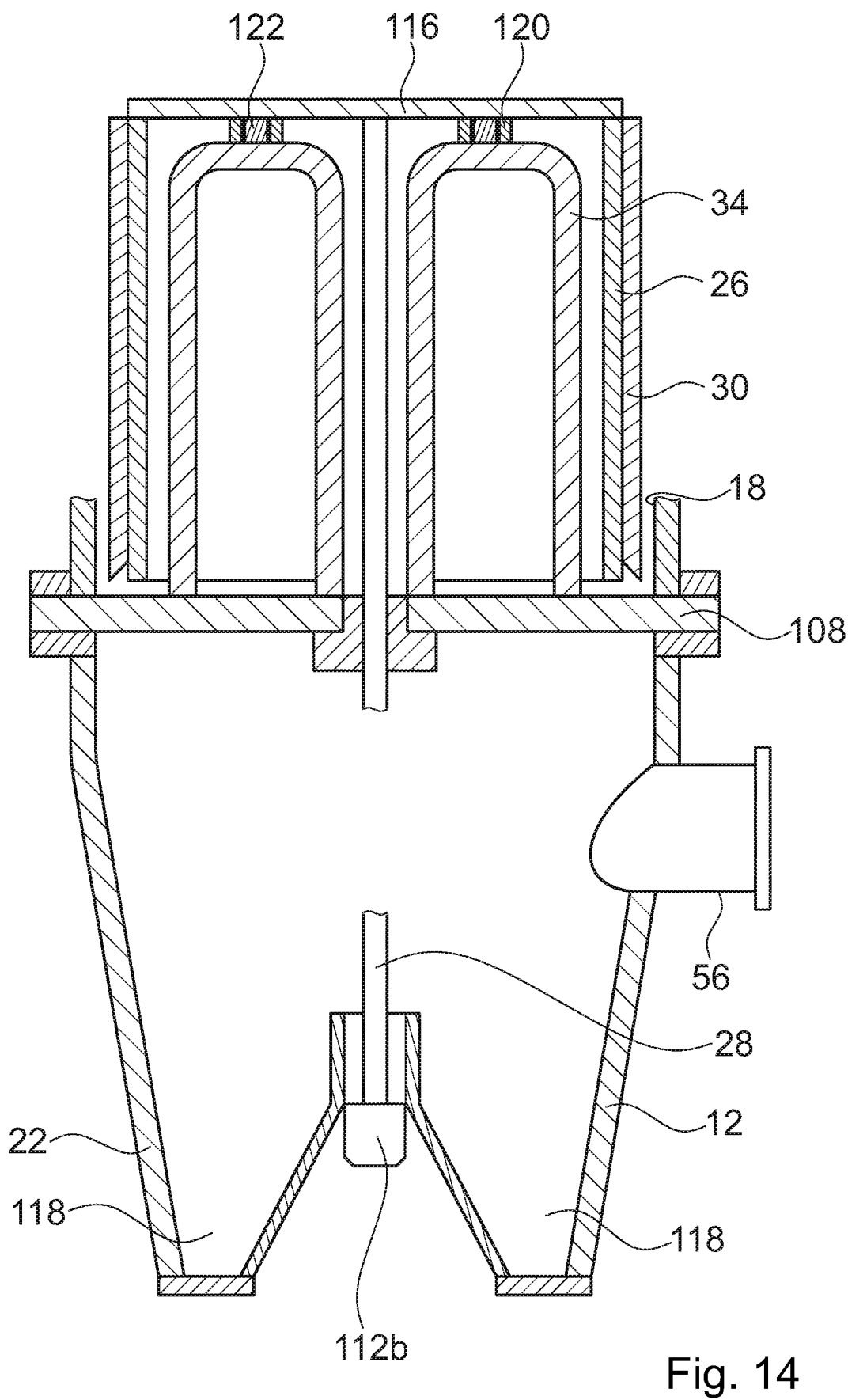
FIG. 14 shows a schematic illustration of a lower part of a further device according to the invention with a second condenser guide.

According to the embodiment shown in FIG. 14, the central rod of the shaft 28 of the rotor 26 is guided centrally through the condenser support 108. In this embodiment, the rotor 26 is mounted in a lower, central rotor bearing 112b which absorbs both axial forces and radial forces and is arranged outside the housing 12. The sealing with respect to the treatment chamber takes place here via a rotating mechanical seal. In contrast to the embodiment shown in FIG. 13, the condenser guide in the embodiment shown in FIG. 14 runs annularly. The material outlet 22 can take place, as shown in FIG. 14, via two conical containers 118 which are virtually vertical and centrally permit access to the rotor bearing 112b. Alternatively, specifically when the material has lower viscosities and/or when the material outlet has lower temperatures, it can also take place laterally (not shown). In order to improve the statics of the condenser 34, the device according to FIG. 14 has a circular-ring-shaped rail 120 which is connected to the upper plate 116 of the rotor 26 or to the condenser 34 and in which a strip 122, which is designed as a counterpart to the rail and is connected to the condenser 34 or to the upper plate 116, runs for radial guidance.

Figure 15:
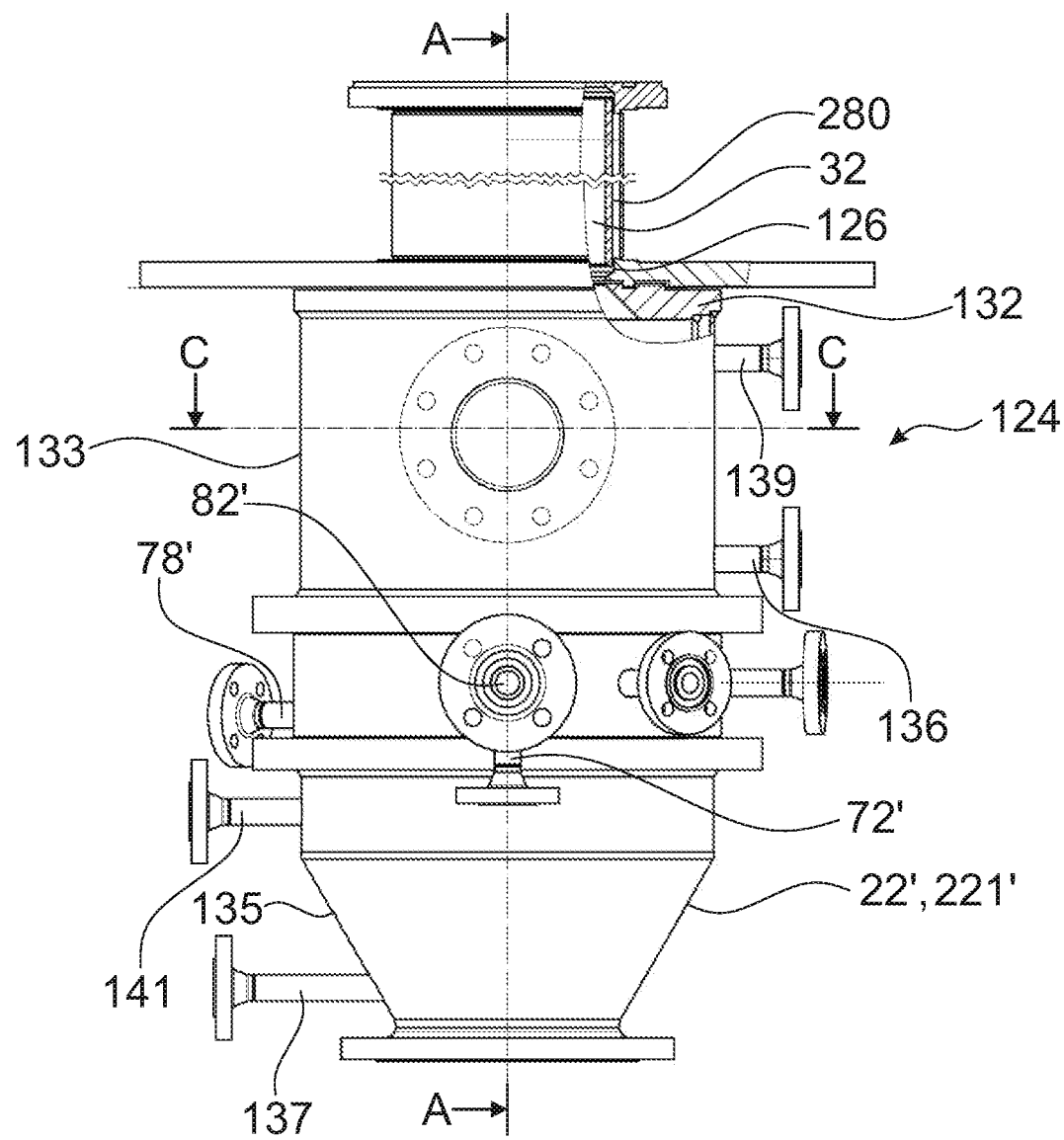
FIG. 15 shows the lower part of a further device according to the invention in a lateral view.
Figure 16:
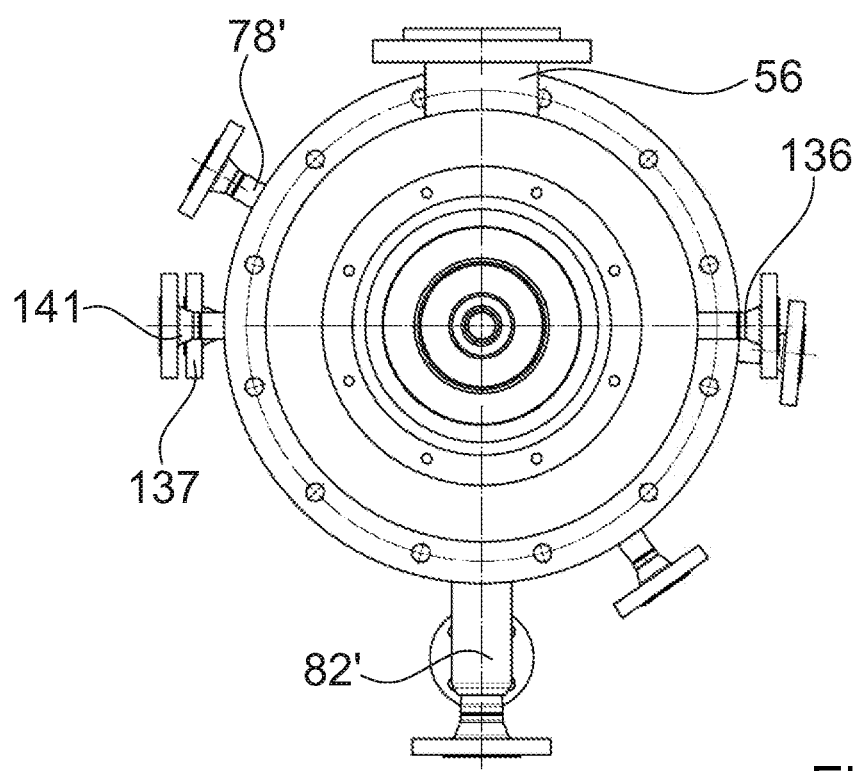
FIG. 16 shows the part shown in FIG. 15 in plan view from above.

As shown in FIG. 15, according to another embodiment the lower part 124 of the device, said lower part comprising the material outlet 22' and the discharge hopper 221', can have a larger diameter than the treatment chamber or the housing jacket surrounding the latter. The risk that material will lead in the narrow points of the material outlet 22 to a blockage as material is being discharged can be minimized.

In the embodiment according to FIGS. 15 to 20, the hollow shaft 280 surrounding the condensation space 32 is mounted in a suspended manner, with it being guided radially by means of a lubricated circumferential bearing 126. Specifically, the circumferential bearing absorbing the radial forces is generally formed by a sliding block in the form of a hardened ring with a sliding layer, for example composed of graphite or Teflon, applied thereto.

The lower part of the device according to FIGS. 15 to 20 has a substantially cylindrical section which adjoins the treatment chamber 16 in the delivery direction, i.e. in the downward direction, and forms a material-collecting chamber 130. The upper wall 132 of the material-collecting chamber 130 directly adjoins the circumferential bearing 126, is configured annularly and is arranged in such a manner that the opening therein runs flush with the opening in the annular circumferential bearing 126 and forms a material passage opening 134. The material passes through the latter from the treatment chamber into the material-collecting chamber 130, wherein the circumferential bearing 126 is additionally lubricated with material.

The material-collecting chamber 130 opens at the bottom into an adjoining discharge hopper 221' which tapers conically downward.

The cylindrical jacket 133 surrounding the circumference of the material-collecting chamber 130 and the jacket 135 surrounding the discharge hopper 221' are of double-walled design and are each fluidically connected to a heating medium supply 136 and 137 and a heating medium output 139 and 141, respectively. The vacuum connection 56 leads away from the material-collecting chamber 130 through the double-walled jacket 133 thereof.

In the embodiment according to FIGS. 15 to 20, the condenser 34' extends into the material-collecting chamber 130 and has a multiplicity of condenser tubes 131. The condenser 34' is surrounded in this, its lowermost, region by a frame 138 which is formed cylindrically in its lower region 140 and tapers conically in its upper region 142 in the direction toward its upper end. Arranged in the cylindrical lower region 140 of the frame are three passages 144 which are distributed in the circumferential direction and by means of which the material-collecting chamber 130 is fluidically connected to the condensation space 32 and which have at least the same free cross-sectional area as the vacuum connection. A respective bay 146 protruding radially from the cylindrical lower region 140 of the frame is formed around the passages 144, the upper end 148 of which bay is configured in the shape of a gable roof. Both the wall of the cylindrical lower region 140 and of the conical upper region 142 of the frame and the wall of the bay 146 are in the form of a double wall, wherein the cavity formed here is configured such that heating medium supplied via a heating medium feed line 150, shown in FIG. 20, flows therethrough.

The frame 138 protects the condenser 34 against material being deposited thereon and being able to solidify by cooling. In addition, the effect achieved by the bay 146 is that the passages 144 toward the condensation space 32 are not covered by material, as a result of which, in turn, it is ensured that a high vacuum can be effectively applied even in the condensation space 32. Furthermore, the effect achieved by the gable roof shape of the upper end 148 of the bay 146 is that the material caught by the treatment chamber 16 can readily flow off, which is additionally assisted by the heating of the frame 138 and of the bay 146.

Formed below the condenser tubes 131 is a cooling medium reservoir 76' which is connected to a cooling medium feed line 72' and which opens into some of the condenser tubes 131. The upper wall of the cooling medium reservoir 76' that is penetrated by the condenser tubes 131 forms the condenser base 80', on which condensate or distillate collects, it being possible for said condensate or distillate to be removed via a condensate outlet 82' leading away from the condenser base. The condensate outlet 82' is surrounded here by an annular channel which serves as a cooling medium feed 74'. The effect is therefore achieved that the cooling of the condensate during the removal and in particular during the passage through the heated jacket 133 of the material-collecting chamber 130 can be maintained. As is apparent in particular from FIGS. 17 and 18, both the cooling medium feed 74' and the cooling medium outlet 78' are each guided through a bay 146. This firstly prevents material from being able to pass onto said lines and solidify by cooling, which could lead to the formation of material deposits which are difficult to remove. Secondly, this prevents cooling medium or condensate from being able to be heated in an undesirable manner by material possibly passing to the cooling medium feed or to the cooling medium outlet.

Figure 17:
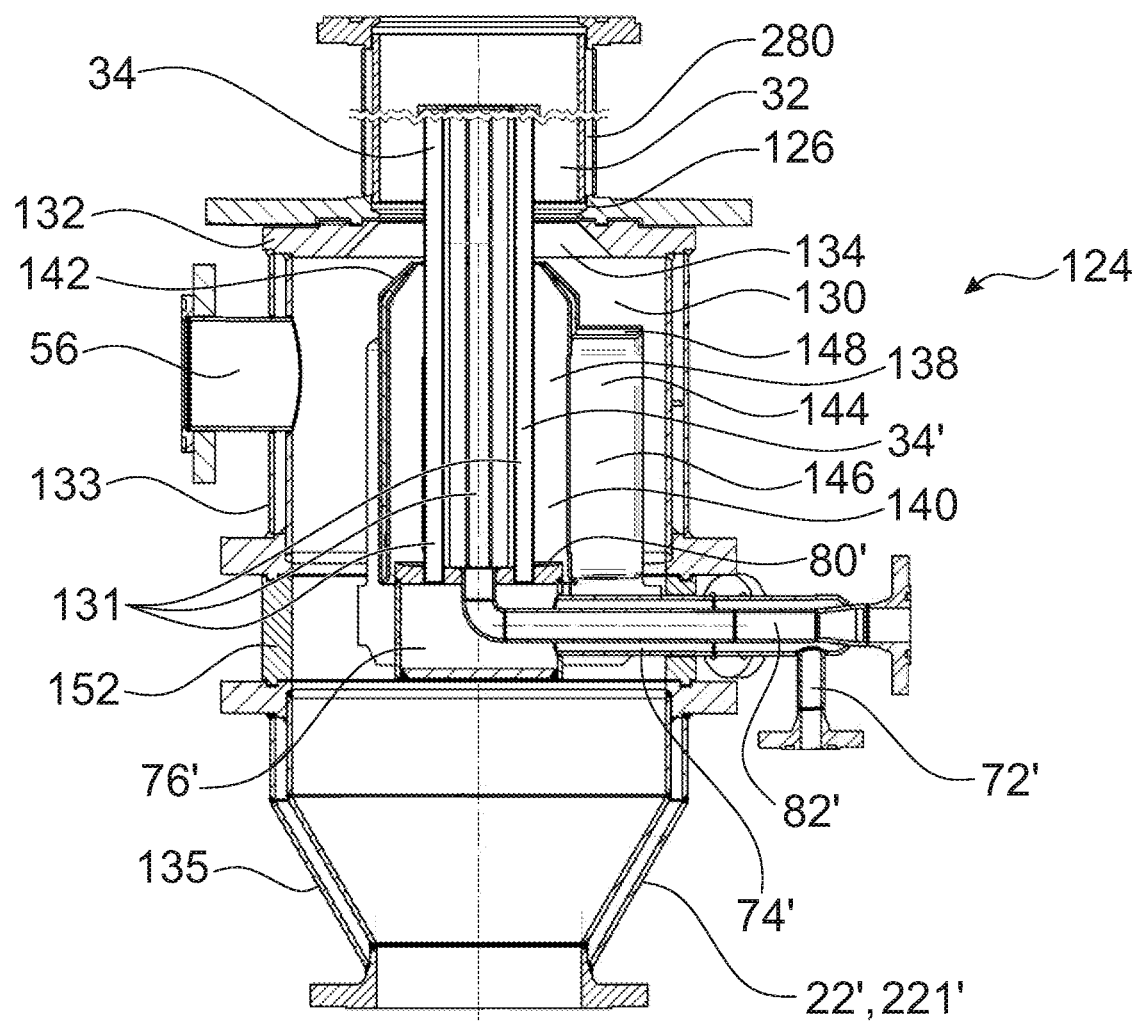
FIG. 17 shows the part shown in FIG. 15 in longitudinal section through the section plane A-A shown therein.
Figure 18:
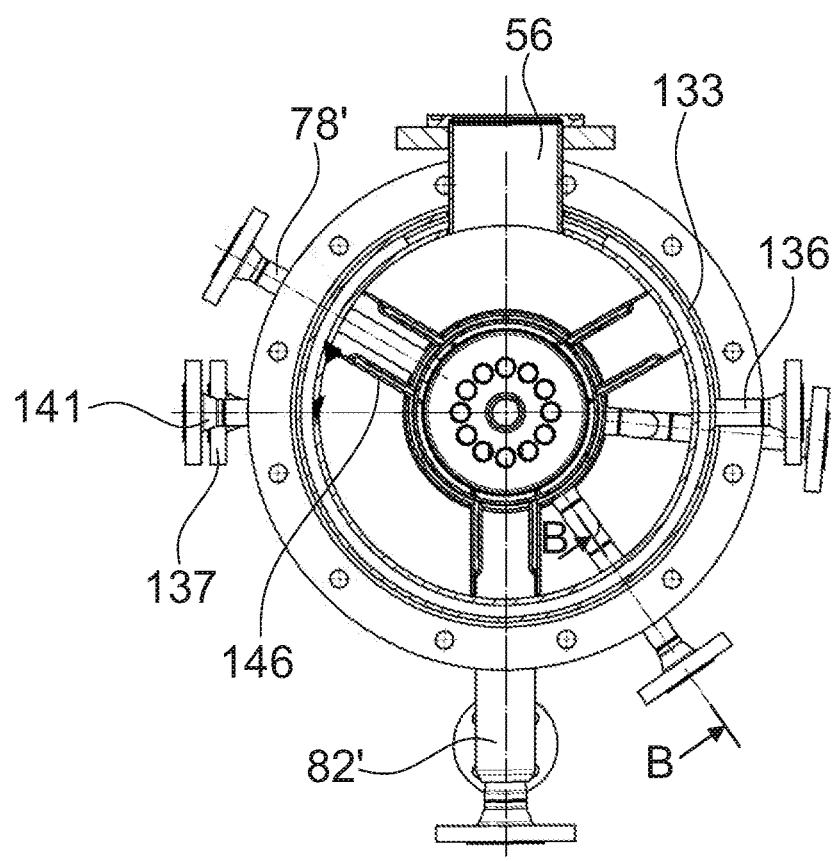
FIG. 18 shows the part shown in FIG. 15 in cross section through the section plane C-C shown therein.
Figure 19:
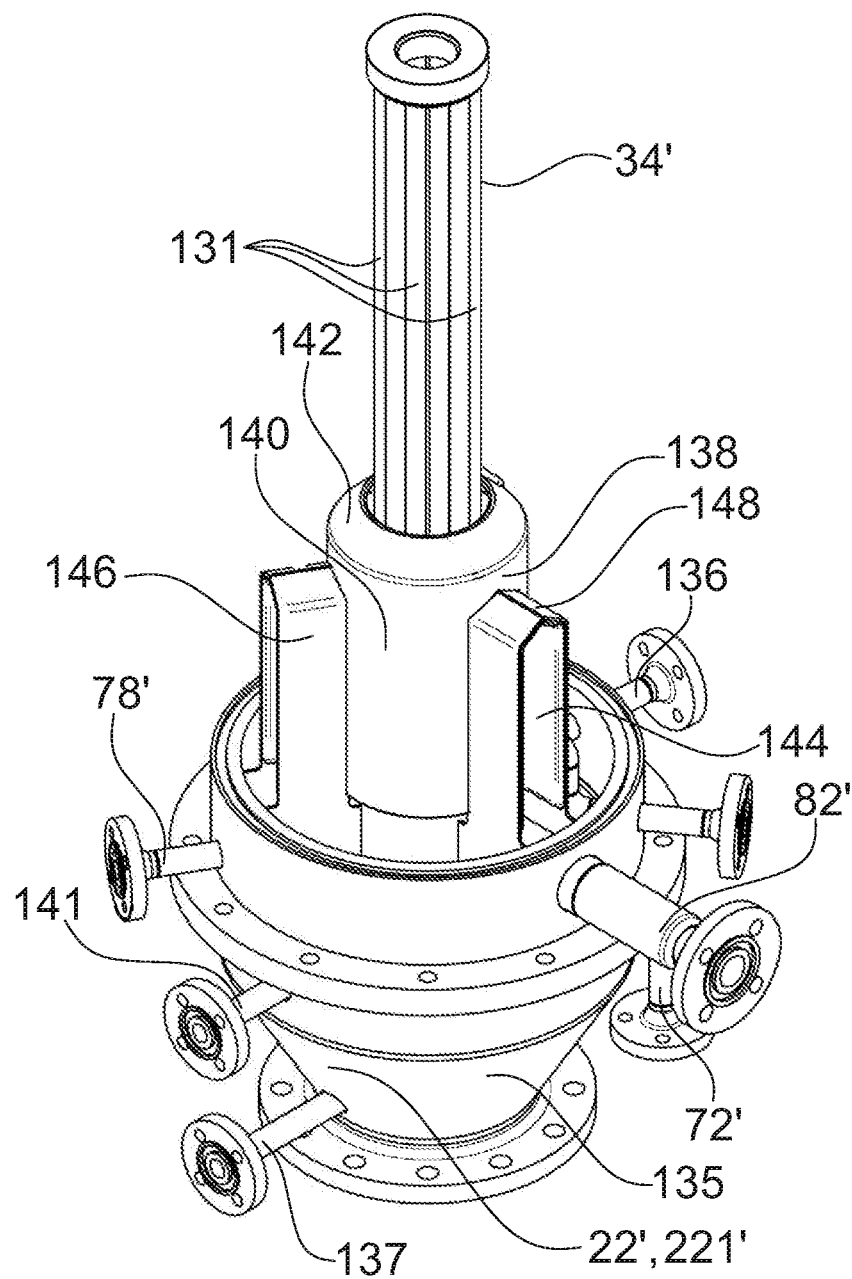
FIG. 19 shows a perspective view of the condenser, the frame surrounding the condenser and the material outlet of the device according to FIG. 15.
Figure 20:
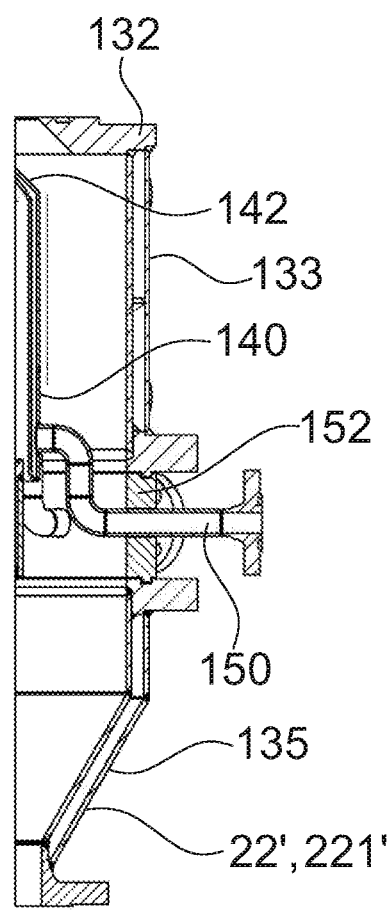
FIG. 20 shows a longitudinal section through the radially outer region of the part shown in FIG. 15 through the section plane B-B shown in FIG. 16.

As is shown, for example, in FIGS. 17 and 20, the material-collecting chamber 130 or the cylindrical jacket 133 surrounding the latter is connected to the discharge hopper 221' via an intermediate flange ring 152. Said intermediate flange ring 152 is welded to the bays 146 and therefore serves as a holder for the condenser 34. The entire condenser 34 with the connections connected thereto, in particular the cooling medium feed line 72', the cooling medium outlet 78', the condensate outlet 82' and the heating medium supply 136 (for the jacket of the material-collecting chamber) and the heating medium feed line 150 (for frame and bay) can be extended downward.

In the embodiment shown, the vacuum connection 56 branches off, as mentioned, from the material-collecting chamber 130. The vacuum is therefore drawn via the material-collecting chamber 130, but not via a direct connection to the condensation space 32. Owing to the vacuum connection not being arranged directly in front of one of the bays or passages that are arranged offset by 120° in the circumferential direction, the gas flow generated during the drawing of the vacuum undergoes a deflection, and it is therefore ensured that droplets are precipitated from the uncondensable gases and said droplets therefore cannot enter the vacuum connection. Alternatively thereto, it is also conceivable for the vacuum to be applied to an annular duct which adjoins the jacket on the inside and from which in turn vacuum ducts sealed in relation to the material-collecting chamber branch. The annular duct according to this embodiment is preferably heated or designed as a double wall, through which a heating medium flows, in order to prevent undesirable cooling or solidification of the material being discharged.

Figure 21:
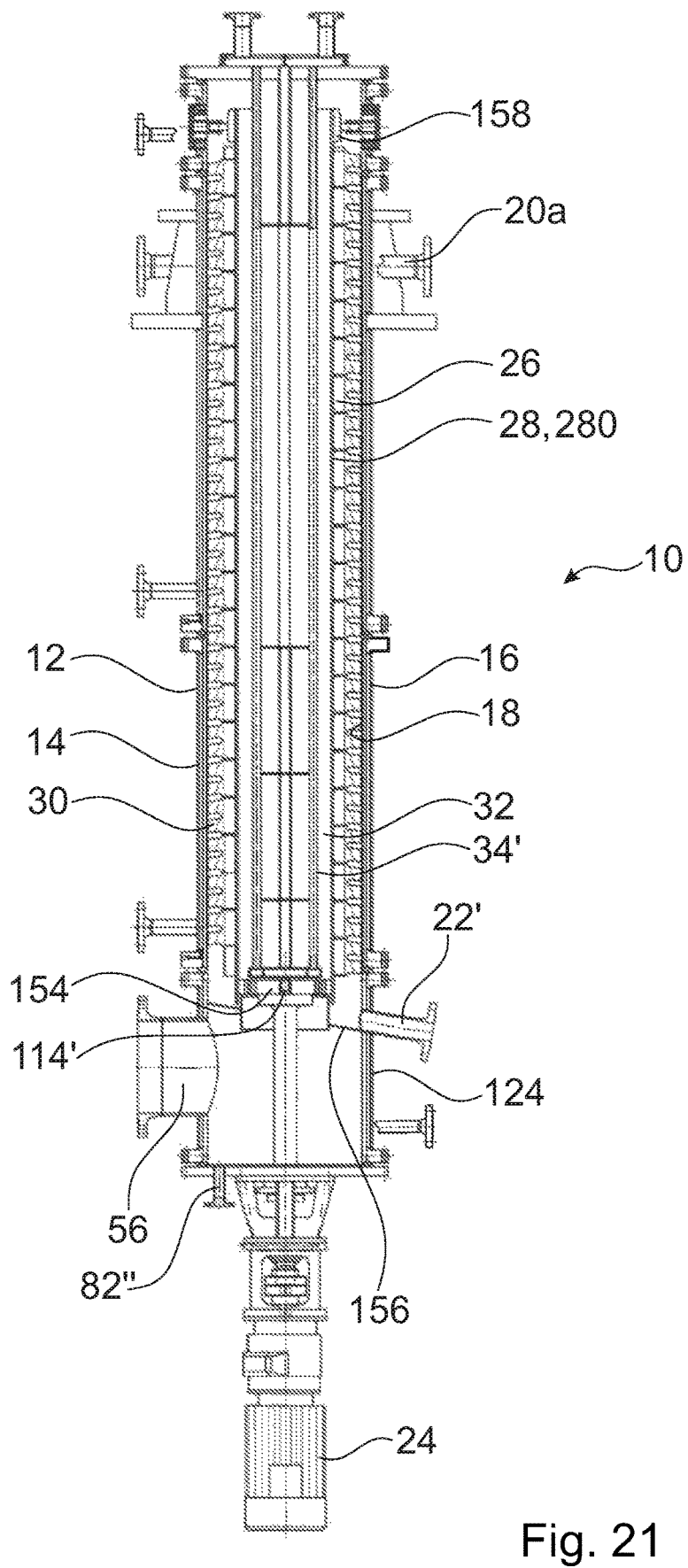
FIG. 21 shows a further device according to the present invention, in which the lower end of the condenser is arranged above the vacuum connection.

According to the further embodiment of the device according to the invention that is shown in FIG. 21, the lower end of the condenser 34' is arranged offset upward in relation to the vacuum connection 56. In this embodiment, the drive unit 24' of the rotor 26 is arranged at the bottom. The radial mounting or guide of the rotor shaft is brought about in this embodiment via a dry-running roller bearing 158 at the upper end of the rotor 26. Within the context of improved statics of the condenser 34', the latter, in the embodiment shown in FIG. 21, has a pin 114' which is arranged at its lower end and is guided through a lower plate 154 of the rotor 26.

The material is fed in, according to this embodiment, via two tangentially configured material inlets 20a. Material and vapors, i.e. the emerging gases, are consequently guided in a co-current flow.

On the outlet side, the material is supplied via an obliquely arranged material trap 156 to a material outlet 22' which is angled slightly downward with respect to the horizontal.

The condensate in turn passes via an annular gap in the lower plate 154 to a condensate outlet 82" leading away vertically downward.

LIST OF REFERENCE SIGNS

10 Device
12 Housing
14 Housing jacket
16 Treatment chamber
18 Treatment surface
19 Region of the vacuum connection
20; 20a, 20b Material inlet (tangential or from above)
21 Inlet region
22 Material outlet
221 Discharge hopper
23 Output region
24 Drive unit
26 Rotor
28; 280 Shaft; hollow shaft
29 Central rod of the shaft
30 Spreading elements
301 Delivery element
302 Distributing element
303 Wiper blades
304 Rigid spreading elements
32 Condensation space
34 Condenser
36 Through openings
38 Angular web plate
38a, b Sides of the top surface of the web plate
40 Delivery rib
42 Shearing edge of the web plate
44 Radial outer edge of the delivery rib
46 Central region
48 Tooth of the distributing element
50 Shearing edge of the teeth
52 Upper part
54 Labyrinth seal
56 Vacuum connection
58 (Connecting) plate
60 Spray protection jacket
62 Bearing shoe
64 Plate (upper end of the hollow shaft)
66 Pin
68 Inner tube
681 Outer wall of the inner tube
682 Inner wall of the inner tube
683 Inner-tube cooling-medium circulation duct
69 Window
70 Outer tube
701 Outer wall of the outer tube
702 Inner wall of the outer tube
703 Outer-tube cooling-medium circulation duct
72 Cooling medium feed line
74 Cooling-medium feed
76 Cooling-medium reservoir
78 Cooling-medium outlet
80 Condenser base
81 Condensate-collecting trap
82 Condensate outlet
83 Cylindrical skirt
85 Protective plate 91 Cover plate
92 Bush
94 Delivery spiral
96; 960 Distributing device; distributing disk
98 Disk base
100 Disk wall
102 Distributing openings
104 Projection on disk edge
106 U rails (Smith rotor)
108 Condenser support
110 Cylinder
112a, b Lower central rotor bearing
114 Pin of the condenser
116 Upper plate of the rotor
118 Conical containers of the material outlet
120 Rail
122 Strip
124 Lower part
126 Circumferential bearing
130 Material-collecting chamber
131 Condenser tube
132 Upper wall of the material-collecting chamber
133 Jacket of the material-collecting chamber
134 Material passage opening
135 Jacket of the discharge hopper
136 Heating medium supply to jacket of the material-collecting chamber
137 Heating medium supply to jacket of the discharge hopper
138 Frame
139 Heating medium output from jacket of the material-collecting chamber
140 Cylindrical lower region of the frame
141 Heating medium output from jacket of the discharge hopper
142 Conical upper region of the frame
144 Passage
146 Bay
148 Upper end of the bay in the shape of a gable roof
150 Heating medium feed line
152 Intermediate flange ring
154 Lower plate of the rotor
156 Material trap
158 Roller bearing
A Axial direction

The invention claimed is:
1. A device for thermally treating material comprising
a housing having a heatable housing jacket which surrounds a treatment chamber and forms a rotationally symmetrical treatment surface extending in an axial direction,
a material inlet, which is arranged in an inlet region of the housing, for introducing the material to be treated into the treatment chamber,
a material outlet, which is arranged in an outlet region of the housing, for discharging the material out of the treatment chamber,
a drivable rotor, which is arranged in the treatment chamber and extends coaxially, for producing a material film on the treatment surface, wherein the rotor comprises a shaft, spreading elements are distributed over a circumference of the shaft, and radially outermost ends of the spreading elements are spaced apart from the treatment surface,
a condensation space, in which a condenser is arranged and into which gaseous material components escaping from the material during thermal treatment can enter,
a condensate outlet for discharging condensed material components condensed in the condensation space, and
a vacuum connection, which is fluidically connected to the condensation space, for removing uncondensed gaseous material components,
wherein the vacuum connection is arranged in a region of the housing that lies downstream of the treatment surface, as viewed in a transport direction of the material travelling from the material inlet to the material outlet.

2. The device as claimed in claim 1, wherein the vacuum connection is configured to apply a vacuum directly to the condensation space.

3. The device as claimed in claim 1, wherein the material outlet leads downward in the axial direction.

4. The device according to claim 3, wherein the material outlet is in the form of a discharge hopper adjoining the treatment chamber in the axial direction.

5. The device as claimed in claim 1, further comprising a lower rotor bearing, in which an end region of the rotor on a material outlet side is mounted.

6. The device as claimed in claim 5, wherein the lower rotor bearing is arranged centrally within the treatment chamber.

7. The device as claimed in claim 1, further comprising a distribution device for distributing the material, which is introduced via the material inlet, on the treatment surface, wherein the distribution device is in the form of a distribution disk which is arranged on the rotor and has a disk base and a disk wall which radially surrounds the disk base, and the disk wall has distribution openings which are spaced apart from one another in a circumferential direction.

8. The device according to claim 7, wherein the disk wall runs substantially perpendicularly to the disk base.

9. The device as claimed in claim 1, wherein the shaft is in the form of a hollow shaft which surrounds the condensation space and which has through openings through which the gaseous material components escaping from the material during the thermal treatment can pass into the condensation space.

10. The device as claimed in claim 9, wherein said device has a spray protection jacket completely surrounding the hollow shaft in the inlet region.

11. The device as claimed in claim 10, wherein the spray protection jacket is formed by delivery elements and by plates, each of said plates connecting two circumferentially successive delivery elements.

12. The device as claimed in claim 1, wherein:
the condenser comprises an inner tube and an outer tube concentrically surrounding the inner tube,
each of the inner tube and the outer tube has an outer wall and an inner wall, which are spaced apart from one another, at least in some region or regions, to respectively form an inner-tube cooling-medium circulation duct in the inner tube and an outer-tube cooling-medium circulation duct in the outer tube, and
the inner-tube cooling-medium circulation duct and the outer-tube cooling-medium circulation duct are fluidically connected to one another.

13. The device as claimed in claim 12, wherein a cooling-medium feed line opens into one of the inner-tube cooling-medium circulation duct and the outer-tube cooling-medium circulation duct, and a cooling-medium outlet leads away from the other of the inner-tube cooling-medium circulation duct and the outer-tube cooling-medium circulation duct.

14. The device as claimed in claim 1, wherein the condenser is surrounded concentrically by a static cover plate in the outlet region.

15. A method comprising thermally treating material using the device as claimed in claim 1 in a process pressure range of 0.001 to 50 mbar.

16. The method according to claim 15, wherein the process pressure range is from 0.001 mbar to 1 mbar.

17. The device according to claim 1, wherein the device is configured thermally separate material components contained in the material.

\* \* \* \* \*